(12) United States Patent
Gartenberg

(10) Patent No.: US 12,443,157 B2
(45) Date of Patent: Oct. 14, 2025

(54) SLEEP TRACKING METHOD AND DEVICE

(71) Applicant: Proactive Life, Inc., New York, NY (US)

(72) Inventor: Daniel Ian Gartenberg, New York, NY (US)

(73) Assignee: Proactive Life Inc., New York, NY (US)

(*) Notice: Subject to any disclaimer, the term of this patent is extended or adjusted under 35 U.S.C. 154(b) by 646 days.

(21) Appl. No.: 16/950,987

(22) Filed: Nov. 18, 2020

(65) Prior Publication Data
US 2022/0155737 A1 May 19, 2022

(51) Int. Cl.
*G05B 19/042* (2006.01)
*A61B 5/00* (2006.01)
(Continued)

(52) U.S. Cl.
CPC ........ *G05B 19/042* (2013.01); *A61B 5/02055* (2013.01); *A61B 5/4812* (2013.01);
(Continued)

(58) Field of Classification Search
CPC .......... G05B 19/042; G05B 2219/2614; G05B 2219/2642; A61B 5/02055; A61B 5/4812; A61B 5/4815; A61B 5/6892; A61B 5/6898; A61B 5/7405; A61B 5/742; A61B 5/746; A61B 5/021; A61B 5/024; A61B 2562/0219; A61B 2562/0247; A61B 2562/0271; A61B 2503/12; A61B 5/0077; A61B 5/01; A61B 5/02141; A61B 5/02444; A61B 5/6891; A61B 5/7455; A61B 2505/07; A61M 21/00; A61M 2021/0016;
(Continued)

(56) References Cited

U.S. PATENT DOCUMENTS

| 5,123,425 A | 6/1992 | Shannon, Jr. et al. |
| 5,385,144 A | 1/1995 | Yamanishi et al. |

(Continued)

OTHER PUBLICATIONS

International search report and written opinion for PCT Application No. PCT/US21/59978 dated Feb. 4, 2022.
(Continued)

*Primary Examiner* — Santosh R Poudel
(74) *Attorney, Agent, or Firm* — Michael Downs; Downs IP Law LLC

(57) ABSTRACT

Systems and techniques for enhanced sleep tracking, monitoring, and conditioning are discussed herein. A device may be couplable to, or integrally formed with, a piece of furniture (a "nearable") receives sensor data from one or more sensors accessible to the device and, based on a determined stage of sleep, may actuate one or more devices for conditioning sleep. In some examples, the nearable may be configured to receive a smartphone such that one or more processors and sensors of the smartphone may be used to perform at least some of the processes. When configured to receive a smartphone, the nearable's cavity may retain the smartphone via a spring mechanism to create an additional button for user interaction, as well as be shaped to minimize an amount of electromagnetic radiation (including light emitted from a screen) of the smartphone, while optimizing sounds output from the smartphone.

23 Claims, 9 Drawing Sheets

(51) Int. Cl.

| | | |
|---|---|---|
| *A61B 5/0205* | (2006.01) | |
| *A61M 21/00* | (2006.01) | |
| *H04L 67/12* | (2022.01) | |
| *H04M 1/725* | (2021.01) | |
| *H04Q 9/00* | (2006.01) | |
| *H04W 4/90* | (2018.01) | |
| *A61B 5/021* | (2006.01) | |
| *A61B 5/024* | (2006.01) | |

(52) U.S. Cl.
  CPC .......... *A61B 5/4815* (2013.01); *A61B 5/6892* (2013.01); *A61B 5/6898* (2013.01); *A61B 5/7405* (2013.01); *A61B 5/742* (2013.01); *A61B 5/746* (2013.01); *A61M 21/00* (2013.01); *H04L 67/12* (2013.01); *H04M 1/725* (2013.01); *H04Q 9/00* (2013.01); *H04W 4/90* (2018.02); *A61B 5/021* (2013.01); *A61B 5/024* (2013.01); *A61B 2562/0219* (2013.01); *A61B 2562/0247* (2013.01); *A61B 2562/0271* (2013.01); *A61M 2021/0016* (2013.01); *A61M 2021/0022* (2013.01); *A61M 2021/0027* (2013.01); *A61M 2021/0044* (2013.01); *A61M 2021/0083* (2013.01); *G05B 2219/2614* (2013.01)

(58) Field of Classification Search
  CPC .. A61M 2021/0022; A61M 2021/0027; A61M 2021/0044; A61M 2021/0083; A61M 2021/0066; A61M 2021/0072; A61M 2205/10; A61M 2205/18; A61M 2205/3306; A61M 2205/3313; A61M 2205/332; A61M 2205/3368; A61M 2205/3375; A61M 2205/3553; A61M 2205/3561; A61M 2205/3592; A61M 2205/505; A61M 2205/52; A61M 2205/8206; A61M 2205/8256; A61M 2205/8262; A61M 2209/082; A61M 2209/084; A61M 2209/088; A61M 2230/04; A61M 2230/06; A61M 2230/10; A61M 2230/205; A61M 2230/30; A61M 2230/42; A61M 2230/60; A61M 2230/62; A61M 2230/63; A61M 21/02; H04L 67/12; H04M 1/725; H04M 1/04; H04M 1/72409; H04M 1/72454; H04Q 9/00; H04W 4/90; G08C 2201/51; G08C 2201/93; G08C 17/02
  See application file for complete search history.

(56) References Cited

U.S. PATENT DOCUMENTS

| | | | |
|---|---|---|---|
| 5,769,084 | A | 6/1998 | Katz et al. |
| 6,811,538 | B2 | 11/2004 | Westbrook et al. |
| 7,469,697 | B2 | 12/2008 | Lee et al. |
| 7,578,793 | B2 | 8/2009 | Todros et al. |
| 7,690,378 | B1 | 4/2010 | Turcott |
| 7,996,076 | B2 | 8/2011 | Burns et al. |
| 8,308,661 | B2 | 11/2012 | Miesel et al. |
| 8,378,832 | B2 | 2/2013 | Cassidy |
| 8,428,726 | B2 | 4/2013 | Ignagni et al. |
| 8,468,115 | B2 | 6/2013 | Gartenberg |
| 9,721,077 | B1* | 8/2017 | Daniel ............... G06F 21/86 |
| 10,524,661 | B2 | 1/2020 | Gartenberg et al. |
| 10,945,659 | B1* | 3/2021 | Kahn ............... A61B 5/4812 |
| 2001/0046887 | A1* | 11/2001 | Yamaoka .......... H04W 52/0258 |
| | | | 455/574 |
| 2006/0293608 | A1 | 12/2006 | Rothman et al. |
| 2007/0016095 | A1 | 1/2007 | Low et al. |
| 2007/0276244 | A1* | 11/2007 | Sui .................... A61B 8/00 |
| | | | 600/443 |
| 2009/0207028 | A1 | 8/2009 | Kubey et al. |
| 2011/0230790 | A1 | 9/2011 | Kozlov |
| 2011/0300876 | A1* | 12/2011 | Lee .................... G01C 21/3438 |
| | | | 455/566 |
| 2012/0179061 | A1 | 7/2012 | Ramanan et al. |
| 2013/0234823 | A1 | 9/2013 | Kahn et al. |
| 2013/0245465 | A1* | 9/2013 | Kasama ............. A61B 5/02416 |
| | | | 600/483 |
| 2014/0057232 | A1 | 2/2014 | Wetmore et al. |
| 2014/0247151 | A1 | 9/2014 | Proud et al. |
| 2014/0269224 | A1 | 9/2014 | Huh et al. |
| 2014/0371547 | A1* | 12/2014 | Gartenberg .......... A61B 5/4812 |
| | | | 600/595 |
| 2015/0128353 | A1* | 5/2015 | Kildey ............... A61B 5/02055 |
| | | | 600/595 |
| 2016/0015314 | A1* | 1/2016 | Dusanter ............ A61B 5/4818 |
| | | | 600/301 |
| 2016/0015315 | A1* | 1/2016 | Auphan ............. A61B 5/7435 |
| | | | 600/587 |
| 2016/0082222 | A1 | 3/2016 | Molina et al. |
| 2017/0007480 | A1* | 1/2017 | Koch .................. A61B 5/681 |
| 2017/0031246 | A1 | 2/2017 | Boef |
| 2017/0223482 | A1* | 8/2017 | Park .................... H04W 4/80 |
| 2017/0312476 | A1 | 11/2017 | Woo |
| 2019/0008992 | A1* | 1/2019 | Kihm .................. B05B 15/60 |
| 2019/0103034 | A1 | 4/2019 | Walter et al. |
| 2019/0334358 | A1* | 10/2019 | Fountain .............. H04M 1/04 |
| 2020/0009349 | A1 | 1/2020 | Shouldice et al. |
| 2020/0100679 | A1 | 4/2020 | Gartenberg et al. |
| 2021/0000402 | A1 | 1/2021 | Gartenberg et al. |
| 2021/0393131 | A1* | 12/2021 | Kawajiri ........... A61B 5/0046 |
| 2022/0133221 | A1* | 5/2022 | Lawlor ............... G16H 40/63 |
| | | | 600/300 |

OTHER PUBLICATIONS

Marshall L., Helgadottir H., Molle M., and Born J. (2006) Boosting slow oscillations during sleep potentiates memory. Nature 444, 610-613.

Marshall L., Molle M., Hallschmid M., and Born J. (2004) Transcranial direct current stimulation during sleep improves declarative memory. J. Neurosci. 24, 9985-9992.

Ngo H.V., Claussen J.C., Born J., and Molle M. (2013) Induction of slow oscillations by rhythmic acoustic stimulation. J. Sleep Res. 22, 22-31.

Ngo H.V., Martinetz T., Born J., and Molle M. (2013) Auditory closed-loop stimulation of the sleep slow oscillation enhances memory. Neuron 78, 545-553.

Tononi G., Riedner B.A., Hulse B.K., Ferrarelli F., and Sarasso S. (2010) Enhancing sleep slow waves with natural stimuli. MedicaMundi 54, 73-79.

* cited by examiner

SLEEP TRACKING METHOD AND DEVICE

BACKGROUND OF THE INVENTION

Tracking sleep can provide a user with knowledge about sleep health and wellness, as well as provide insight into any underlying pathologies. For instance, it is beneficial for a user to determine quality of sleep, interruptions of sleep, an amount of time spent in various sleep stages (e.g., N1, N2, REM, etc.), cortical arousals during sleep, and cardiovascular irregularities. But tracking sleep using state of the art wearables, sound recorders, smart beds, and smartphones may provide inaccurate measurements.

BRIEF DESCRIPTION OF THE DRAWINGS

The detailed description will now be described, by way of examples, with reference to the accompanying drawings, where like numerals denote like elements, a leftmost numeral indicates the original figure in which the element is found, and in which.

DETAILED DESCRIPTION OF THE INVENTION

Figure 1A:
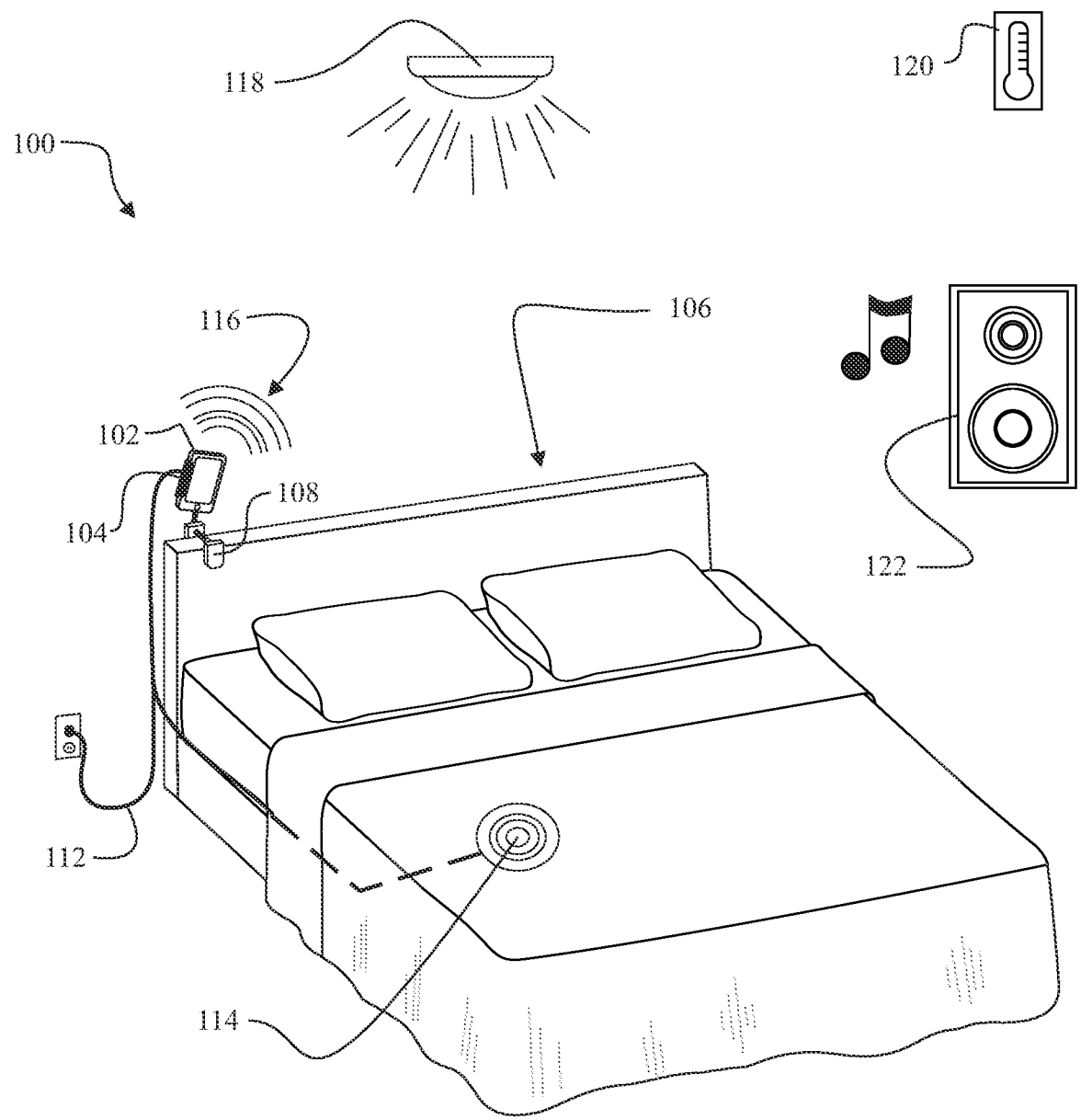
FIG. 1A depicts an example nearable device as described herein illustrating the device being coupled to a bed and coupled to one or more sensors.

The following detailed description describes techniques (e.g. methods, processes, and systems) for measuring, tracking, and influencing (or conditioning/augmenting) sleep (including induction of valence state associations, deep sleep stimulation, lucid dreaming, snore prevention, sleep inertia mitigation, and cognitive behavioral therapy) with a device that is either integrated with or coupled (e.g., mechanically, electrically, wired or wirelessly) to furniture in a region proximate to where a user sleeps, otherwise referred to herein as a "nearable enhancement device", a "nearable device", or a "nearable system." The nearable may connect (whether wirelessly or via a wired connection) to one or more sensors, such as wearable sensors, as well as may interact with a user's smartphone for additional sensors, processing, and/or communication protocols (audiovisual signals, tactile signals, wireless communication, etc.).

Throughout the disclosure, such devices that are close to the user, but not directly attached to the user, yet that can be coupled to or integrated with a piece of furniture, are referred to as, "nearables." Specifically, a nearable device is any device that can measure the physiological state of the user, without being physically attached to the user. This term is in contrast to a wearable device, which is a device that is physically attached to the user. A smart phone is an example of a nearable. Such nearables may be, in at least some examples, attached to furniture to turn it into "smart" furniture or otherwise furniture capable of being in the proximity of the user and therefore can perform sensor measurements and integrate with various devices that can actuate stimulation to a user (e.g., of speakers, vibrational elements, temperature control, a coffee maker, and the like). In various applications, such nearables may be oriented proximate a region where a user normally sleeps such as, but not limited to, a bed, a nightstand, a dresser, a headboard, a footboard, a lamp, a chair, a sofa, a couch, or the like. A "nearable enhancement device," described herein, houses one or many nearable devices and augments them in such a way as to better measure and enhance sleep, the transitions between sleep and consciousness, and consciousness, (e.g. when the user is awake). Nearable enhancement devices are the mechanism that attaches the nearable device to furniture to turn the furniture into smart furniture and optimize the functions of the nearable for measurement and enhancement of sleep and wake.

As will be described in detail herein, such nearable enhancement devices may be integrally formed, or couplable (e.g., able to be mechanically and/or electrically coupled to) to existing furniture. In at least some examples, the nearable enhancement device may be configured to receive a user's smartphone. In such examples, the nearable enhancement device comprises a spring and/or locking mechanism in which the user secures the smartphone to the nearable enhancement device. Once secured, the smartphone may communicate with one or more processors on (or accessible to) the nearable enhancement device, receive data from the one or more sensors coupled to (or accessible to) the nearable enhancement device, and/or actuate one or more devices coupled to the nearable enhancement device, such as a wearable placed on the wrist, wring, chest, leg, torso, or scalp. Of course, though described herein with respect to the nearable enhancement device being coupled to a smartphone, the disclosure is not meant to be so limiting. In various examples, the nearable enhancement device can be coupled to other nearables, such as a tablet (such as an iPad™), a laptop, a smart device (e.g., a smart watch or small sensor apparatus), or otherwise.

Any one or more of the sensors coupled to the nearable enhancement device may comprise, for example, one or more pressure sensors, temperature sensors, accelerometers, gyroscopes, magnetometers (or other means for inertial measurement), cameras, lidars, radars, ultrasonics, actigraphy sensors, barometric sensors, microphones, light sensors, infrared sensors, distance sensors, heart rate sensors (whether contacting the user or remote from the user), etc. In any example, the sensors may be embedded in the furniture and/or user's clothing. As several non-limiting examples, one or more pressure sensors, capacitive sensors, inertial measurement units, or otherwise may be embedded into a user's bedframe or box spring/mattress for detecting a user presence, a user's pajamas may be embedded with a temperature dependent RFID for remotely monitoring a user's body temperature (or proxy thereof), and the like. Such sensors may be placed in locations for generating optimal sensor data and configured to send such sensor data to a central location of the nearable enhancement device either via wireless and/or wired communications.

In those examples in which the nearable enhancement device is coupled to a user's smartphone, the nearable enhancement device may further access sensors available on the smartphone and/or the phone may access the sensors coupled to (or otherwise accessible to) the nearable enhancement device. Such smartphone sensors may comprise, for example, one or more cameras, infrared sensors, accelerometers, gyroscopes, magnetometers, barometric sensors, temperature sensors, microphones, distance sensors, heart rate sensors, the ability to make a phone call to a healthcare provider, and the like. In addition to sensors available via the smartphone, the nearable enhancement device may also utilize one or more outputs of the smartphone (e.g., speakers, screens, wireless communication, near field communication (NFC), Bluetooth, Zigbee, or the like).

Such a nearable enhancement device may be coupled and/or integrally formed with a piece of furniture, as above. In some examples, the coupling may comprise a clamp, grip, vice, bolts, screws, glue, zip ties, velcro, or any other attachment mechanism (whether fixed or removable) to affix the nearable enhancement device to the furniture. Regardless of whether the nearable enhancement device is coupled to or integrally formed with the furniture to which it is attached, the nearable enhancement device may comprise one or more pivot points and or mechanisms to allow the nearable enhancement device to change one or more of a position and/or orientation of itself and of the nearable such as, but not limited to, a flexible arm, swivel joints, ball joints, rotation points, and the like. In various examples, at least some such joints may be passive whereas in other examples such joints may be controlled using one or more of stepper motors, servos, and the like. Such motors may be controlled based on one or more processors located in the nearable enhancement device, smartphone, nearable, wearable or otherwise. As will be described in detail herein, the position and/or orientation of the nearable enhancement device and the nearable may be adjusted over the course of a user's sleep in order to better track the user with the one or more sensors and/or to ensure an optimal deliver of the one or more signals (e.g., audiovisual signals) output by one or more of the nearable enhancement device or, in some examples, the coupled smartphone.

In various examples, the nearable enhancement device may electrically couple (whether wirelessly or via one or more wired connections) to one or more sensors and/or actuators proximate the nearable enhancement device. In at least some examples, the nearable enhancement device may have a power source associated therewith, either by battery and/or by connecting to an external power source (e.g., wall socket). The power source may provide power to any one or more processors associated with the nearable enhancement device, to any sensors and/or actuators associated therewith, any smartphone (or other external device) coupled thereto, or otherwise. In various examples, when electronically coupled to the smartphone (e.g., using one or more of a wired, wireless, or contact coupling) for data and/or power, the nearable enhancement device may rely on connectivity of the smartphone (e.g., cellular (e.g., LTE), wireless (e.g., WiFi), near-field communication, Bluetooth, etc.) to transmit and receive data from the one or more sensors and/or processors associated with the nearable enhancement device including, but not limited to, remote servers or the like.

In at least some examples, the nearable enhancement device may comprise a cavity into which a user's smartphone is inserted. In various examples, the nearable enhancement device may comprise mechanisms to allow the smartphone to be releasably coupled to the nearable enhancement device such as, for example, one or more spring loaded assemblies (such as, but not limited to, a spring clip) to apply pressure to the device once inserted, by being formed in a shape such that the nearable enhancement device is deformed to apply sufficient pressure to the smartphone to keep the smartphone immobilized within the cavity, and/or other mechanical, electrical, or other mechanisms for providing releasable coupling of the smartphone to the nearable enhancement device.

The cavity may, in some examples, provide additional features to promote better sleeping conditions for the associated user. As non-limiting examples, walls forming the cavity may be formed with a metallic grid or mesh (including being fully metallic) to block electromagnetic radiation transmitted to and from the smartphone (whether emitted or received) as a Faraday cage. Such electromagnetic (EM) radiation may also comprise, for example, light emitted from a screen of the device. In such examples, blocking such electromagnetic radiation may improve the quality of sleep of a user by eliminating external sources of disturbances. In at least some such examples, however, the cavity may provide for a region which does not block such EM signals to allow for transmission of data from the smartphone. In some such examples, covering all (or at least a portion) of the screen of the associated smartphone may reduce addictive tendencies of a user to use the smartphone prior to sleep or after awakening from sleep during the night, but still in bed, and to enhance the sleep experience. In still further examples, the cavity may have a lock mechanism that provides an extra step to the user in being able to access the phone, which could further help reduce addictive tendencies associated with smart phone use, such as a user performing a small puzzle to open the phone from the cavity or simply by a multi-action based unlocking mechanism.

In various examples, the cavity may serve to tailor an acoustic response from the one or more speakers associated with the smartphone or the nearable enhancement device. As a non-limiting example, the cavity may be shaped to one or more of amplify sound generated by the one or more speakers, direct sounds generated in a particular direction (e.g., to maximize the sounds for the user), and the like. In various examples, the acoustic amplification component may be coupled to a motor (or otherwise) to enable enhancing sound for a particular user based on a location of the user in a bed throughout the night. In yet another example, the amplification and direction of sound can be enhanced with a funnel that blows air in particular directions such that sound can be delivered precisely to a user, such as on the left versus the right side of the bed.

In at least some such examples (e.g., in those which are spring loaded), the nearable enhancement device may comprise one or more additional proximity sensors including, but not limited to, Hall effect sensors, touch sensors, pressure sensors, radio frequency distance sensors and the like for determining whether the smartphone is properly loaded and whether the user is going to bed and getting out of bed, since detecting a bedtime and wake time are important measures in evaluating a user's sleep. In further such examples, such a proximity sensor may be used (be either one or more of the nearable enhancement device or the smart phone) to act as a button. As a non-limiting example, the combination of the smart phone and the nearable enhancement device may act as an alarm, when triggered. In such an example, the proximity switch may be used to trigger a snooze and/or release of the alarm, although any other use of such a sensor is contemplated as an additional input for sleep monitoring, tracking, or conditioning.

In various examples, the nearable enhancement device may undergo a calibration procedure. Calibration is used in various examples to determine intrinsics (e.g., for intrinsics ambient temperature for temperature sensors, focal length and point, shutter speed, lens distortion parameters, etc. for cameras, a background noise level for microphones or ambient light sensors, and the like) and/or extrinsics (e.g., positions and/or orientations of one or more sensors relative to the device) of the one or more sensors accessible to the nearable enhancement device. In some examples, the nearable enhancement device may actuate a vibrational element during calibration for visual-inertial calibration, to calibrate one or more of the actigraphy sensors, accelerometers, gyroscopes, etc. Such calibration may further calibrate the position and/or orientation of the nearable enhancement device (and/or smart phone) relative to a room and/or bed of a user, motors for controlling the position and/or orientation of the nearable enhancement device, and any sensor of the nearable enhancement device, associated smart phone (if any), and any sensor or actuator accessible thereto. In some examples, calibration may further comprise determining an audible level for a user such that sounds from the device may be based on the audible threshold determined.

Regardless of calibration, the nearable enhancement device may determine one or more of an optimal position or orientation (together a pose) for the device as coupled to the smartphone. As a non-limiting example, sensor data from one or more of the sensors may be used to determine a location where the user is going to sleep. Such a position may be determined based on, for example, machine learned models using the camera data and sound recording data, input from a user indicating where on an image the user sleeps, or the like. Based on the location, the nearable enhancement device (or one or more devices accessible to the nearable enhancement device), may determined an optimal position and/or orientation for the nearable enhancement device to be in. Such optimal positions and/or orientations may be determined to, for example, minimize an amount of brightness of the smartphone to the user, ensure sensor data of a sensor (e.g., a camera on the smartphone) is optimized to capture user data (e.g., an image of a user takes up at least a threshold amount of an image generated by the camera), etc. In some examples, the nearable enhancement device may prompt (e.g., by causing a display screen of the smartphone) to display a message to optimize the location. As a non-limiting example, the nearable enhancement device may cause the screen to display arrows, or other indicia, such that a user can manually move the nearable enhancement device to an optimal position. In some example, one or more motors or other actuators may move the nearable enhancement device to be in the optimal position and/or orientation.

Once positioned and/or calibrated, the nearable enhancement device may be left in a fixed position such that the smartphone may be repeatedly placed and removed in the cavity as defined in detail above. Once calibrated and optimally positioned, the nearable enhancement device (which may act via the smartphone) may begin a sequence of actions to monitor, track, and/or improve sleep based on an initialization procedure. In some example, the nearable enhancement device may begin such processes when the user's smartphone is inserted and or being charged (as may be detected by the Hall effect sensor, pressure sensor, or otherwise in the nearable enhancement devices processor), using natural language processing to recognize that the user is ready to begin sleep, or the like. Whereby inserting the phone in the cavity simultaneously charges the nearable enhancement device or devices and actuates a sequence of events, such as via a speaker recording that is triggered when the nearable is detected in position, and that the user can set, such as to trigger a smart home interface set of interactions using a command like, "Hey Google, I'm Going to Bed," whereby the user can record any message that they desire to be replayed by the in order to trigger the events (i.e. "Play Dan's Bedtime Routine").

Once started, either by plugging in the nearable, having the user activate the nearable via their voice or touch, or by pressing a button on the nearable enhancement device that plays a voice activated sound to engage with the nearable, the nearable or the nearable enhancement device may communicate with one or more actuators to provide an ideal sleep setting for the user including, but not limited to, dimming or shutting lights, lowering or closing blinds, lowering a temperature of an air conditioner, starting a fan, playing soothing music, releasing a soothing odor, or the like. Further, the one or more sensors accessible to the nearable or nearable enhancement device may begin collecting data to determine a stage and/or quality of sleep of the user.

Such sensors may be used to determine a quality of sleep. As a non-limiting example, any one or more of the IMUs (whether in the nearable, coupled to the furniture, or in the associated smartphone or device) may be used to determine actigraphy and/or physiological data associated with a user's sleep. For example, the nearable enhancement device may include a mechanism that attaches the cavity that houses the smartphone to a motion sensitive material, such as rubber and plastic underneath the bed, and can increase the sensitivity of detecting motion of the user, by differentially moving the nearable in the nearable enhancement device, when a user or multiple users move in the bed or sleep furniture. The camera of a nearable may be used to determine the lighting state of the room (lights on, off, dim, sunrise, sunset, etc.), and may engage with a filter on the nearable enhancement device to block out any identifiable information, in order to ameliorate privacy concerns of the user, and in addition, be used for detecting the heart rate and/or respiration rate of the user, the pose (position and/or orientation) of the user throughout the sleep period, motion of the user, and the like. Microphones may be used to determine an ambient noise level, any snoring of the user, talking in a user's sleep, noise pollution, and the like. In those examples in which subsonic sounds are projected, responses from the subsonics received by the microphones may be used to determine a respiration rate or heart rate. The sensor data can also be enhanced by additional wearables that are relatively more invasive than a nearable, such as a wrist-based or headset based device that can more accurately measure valuable signals for measuring sleep and various cognitive states, for example, signals like heart rate, motion, pulse oximetry, and EEG.

Together, all such aggregated sensor data (and/or data derived therefrom) may be used to determine a sleep state of the user. Additional details for determining such a sleep state may be found in, for example, U.S. Pat. No. 10,524,661 entitled "Sleep Monitoring and Stimulation" having a filing date of Jun. 6, 2014, the entirety of which is hereby incorporated. As an example, one or more machine learned models may be trained based at least in part on the sensor data (and/or data derived therefrom) to determine a user's sleep state. By receiving such additional sensor data (e.g., from an IMU coupled to a bed frame), it is possible to determine such sleep states from weaker signals than previously possible. In various examples, such determinations may be made by one or more processors of the nearable, of the coupled smartphone (if any), and or any server remote therefrom. In at least some such examples in which the smartphone is received in an EMF-blocking cavity, data may be stored at one or more of the nearable or smartphone for later transmission and processing.

As non-limiting examples, such sensor data may be used to determine a breathing rate of the user, a heart rate of the user, an amount of ambient light, an ambient temperature, a temperature of the user (e.g., as may be determined from remote RF or thermal imaging), a sound level in the environment, actigraphy data, and the like. In various examples, the stage and/or quality of sleep may be determined based on, for example, the techniques described in detail in U.S. Pat. No. 10,524,661 entitled "Sleep Monitoring and Stimulation" filed on Jun. 12, 2014, the entirety of which is hereby incorporated by reference. In at least some examples, sleep stage and/or quality may be determined based on machine learned models (receiving at least a portion of the sensor data as input), and the like. Such determinations may be made continuously and/or at a given frequency, which, in some examples, may be based at least in part on the frequency the sensor data is made available to the nearable or nearable enhancement device (though any other frequency is contemplated).

Based on the determinations made regarding the stage and/or quality of sleep, the nearable or nearable enhancement device may perform one or more additional actions including, but not limited to, determining one or more signals which are later transmitted to one or more actuators accessible to the system, to cause the one or more actuators to enhance a sleep quality of a user, alter a sleep stage of a user, stimulate the user to roll over and stop snoring, help the user fall asleep, keep the user asleep, wake up the user less fatigued, alert a doctor or loved one of a potential health condition, such as a cardiovascular event, or induce a valance association as described in U.S. patent application Ser. No. 16/504,285 entitled "Valence State Memory Association" filed on Jul. 7, 2019, the entirety of which is hereby incorporated by reference. For example, an amount of light can be increased or decreased, the temperature of the room may be altered (up or down), vibrational elements associated with the sleep location (e.g., in a bed), or located on a wrist device, may be actuated, sounds may be played and/or associated volumes of sounds may be altered, transcranial electromagnetic stimulation may be applied (including transcranial direct current stimulation), scents may be altered, or otherwise. In various examples in which the nearable comprises one or more motors (or other mechanisms by which the nearable may reorient itself or portions thereof, such as gears or levers that the user can adjust to orient the nearable and nearable enhancement device), similar procedures as above may be used to reorient the nearable based on changes in the user's position to optimize, for example, the user in a field of view of one or more sensors. Additionally, the user may reorient the nearable to their liking, such that sound from the system is louder on the left versus the right side of the bed, i.e. the user can orient the nearable in the cavity of the nearable enhancement device such that the speaker is directed in different directions. The motor system can further move the device such that it is optimally directed at the user or users for both measuring and enhancing sleep. In at least some examples, a volume or quality of sound, light, or temperature stimulation, or the like that can be delivered may be altered based on actuating a motor coupled to the acoustic cavity of the device.

Similar processes and techniques to those described herein can be used for cognitive behavioral therapy. In some examples, in addition to measuring sleep, data collected via the nearable or nearable enhancement device may be used to categorize people into different phenotypes of insomnia, sleep apnea, or the like. As a non-limiting example of such, data available to the nearable or nearable enhancement device may be used to determine that an associated user is having trouble falling asleep and may deliver a stimulus (e.g., light, sound, temperature, etc.) to remediate the insomnia (e.g., relaxing music or otherwise). In those examples in which apnea is detected while sleeping, the device may deliver a stimulus to promote the user to roll over when an apnea instance. Such stimulations may be adjusted based on feedback from continued measurements until a successful intervention is determined.

These and other advances will be discussed in additional detail below with respect to the figures.

Example System

FIG. 1A illustrates an example system 100 for monitoring, tracking, and/or influencing a user's sleep. As depicted, a smart phone 102 of a user is coupled to the nearable enhancement device 104. As will be described in more detail herein, such a coupling may comprise, for example, any one or more of a physical coupling or electrical coupling (whether wired and/or wireless). The nearable device 104 may be mechanically coupled to a bed 106 in which the user is (or is going to) sleep.

As illustrated in the example of FIG. 1A, the nearable device 104 may be physically attached to a headboard of the bed 106 via a coupling 108, or can be coupled to other parts of the bed or sleep furniture, such the footboard, under the mattress, or under the box-spring, or simply placed on the bed or sleep furniture itself. The coupling 108 may allow for the nearable device 104 to be releasably coupled with different levels of ease for coupling or decoupling the device, for purposes of preventing the user from using their devices while they should be sleeping instead. As illustrated in FIG. 1A, the coupling 108 comprises a vice clamp wherein the clamp may be adjusted based on the width of the headboard and provide sufficient force to keep the nearable device 104 (and the smartphone 102) stable throughout the night. Of course, the coupling 108 may comprise any other mechanism by which to affix the nearable device 104 to the bed (whether or not releasably) including, but not limited to, clamps, spring clips, connector clips, pressure mounts, or otherwise. For example, in another example the nearable enhancement device could be clipped to the side of the mattress with a pin.

The coupling 108 may also comprise a portion which allows a change in one or more of an orientation or a position of the nearable device 104 relative to the position at which the coupling 108 attaches to the bed 106. This serves an important function for the user when the device, such as an iPhone, has speakers located on only one side of the device, meaning that by orienting the device, the speaker of the device can be appropriately directed at the user. As illustrated in FIG. 1A, such a portion is illustrated as pliable portion. The pliable portion allows the position and/or orientation of the nearable device 104 to be altered (or repositioned) and, subsequently, maintain a stiffness such that the nearable device 104 is stable and does not move from that position and or orientation (within tolerances), yet is also sensitive to micromotions of the sleep furniture by the association of movements between the sleeper, mattress, and frame of the bed or other sleep furniture. In some examples, these micromotions, or small movements of the sleep furniture that capture when a user gets in and out of the sleep furniture and rolls over during sleep, can be made more sensitive using material placed under the sleep-furniture that enhances the motion of the nearable enhancement device, and thus the signal of motion registered on the smart phone or nearable's processer (such as further illustrated with respect to the discussion of FIG. 1B). In other examples, as will be discussed in detail herein, such a potion may additionally or alternatively comprise one or more actuators (e.g., stepper motors, servos, linear actuators, or the like) to automatically adjust the position and/or orientation of the nearable device 104 relative to the coupling location.

The smart phone 102 may be releasably coupled to the nearable device 104 via any one or more of springs, suction, magnets, friction pads, magnets, gravity via a shelf housing for the smart phone or nearable, or the like. A power line 112 may provide power to the nearable device 104 and/or to the smart phone 102 and can be oriented inside of the nearable enhancement device (not depicted in the figure), in order to hide the plug and make the device more aesthetically pleasing. Alternatively, a wireless phone charger can be oriented in the housing unit of the nearable, such that, for example, the wireless phone charger is place behind the phone so that the phone is automatically charged simply by placing the phone into the nearable enhancement device. In at least some examples, a Hall effect sensor (or other proximity type sensor, e.g., near field communication, Bluetooth, etc.) may be used to determine when the smart phone 102 has been inserted into the nearable 100. In addition to the Hall effect sensor, and as will be illustrated in additional figures, when the smart phone 102 is inserted, a spring may be compressed that is releasably held in place (e.g., locked) by the nearable device 104. In various examples, such a lock may be released by the nearable device 104 as part of an alarm, requiring a user to depress the smart phone 102 again in order to turn the alarm off. The ease of unlocking the phone may be made more or less difficult based on the user's level of fatigue or issues with responding to an alarm in the morning, where for example, if the user has a hard time waking up in the morning, decoupling the phone or nearable to turn it off could be made more difficult with the nearable enhancement device by making the unlocking more complicated. In at least some examples, depressing the nearable device 104 may further cause release, and initiate a bedtime process like falling asleep or snoozing the phone using, for example, the accelerometer within the phone or nearable in order to distinguish this particular motion of depressing the nearable device within the nearable enhancement device. In additional or alternative examples, depressing the nearable enhancement device 104 may trigger the release of a fragrance (e.g., lavender, etc.) stored in the nearable enhancement device 104 to aid in sleep promotion and seamlessly integrates into the bedtime routine because the fragrance can be triggered when the user charges their smart phone.

Although depicted in FIG. 1A for illustrative purposes as the smart phone 102 coupled to the nearable device 104, the description is not meant to be so limiting. In other examples, no smart phone may be required, as the nearable device 104 may comprise its own set of sensors, lighting, speakers, processors, memory, etc. In the example illustrated, however, once coupled (whether wirelessly, wired, mechanically, etc.), the nearable enhancement device 104 and the smart phone 102 may share one or more processors, sensors, communication protocols, etc. As illustrated, for example, one or more additional sensors 114 may couple to the nearable device 104. Again, such coupling may be wired, wirelessly, or otherwise. As shown here in FIG. 1A, however, the additional sensor may comprise a wired connection (where the dashed portion represents a portion of the wire which lies under the bed or between mattresses). Such additional sensors 114 may comprise, for example, pressure sensors, inertial measurement units, actigraphy monitors, temperature sensors, cameras, heart rate sensors, or any other sensor described herein.

By placing such sensors throughout the bed 106, weaker signals from the combination of sensors (whether in the smart phone 102, the nearable device 104, and/or the additional sensors 114) may provide a better indication of a stage or phase of sleep, a quality of sleep, or otherwise as will be described in detail herein. In various examples described in detail herein, such a phase or stage of sleep may comprise, for example, N1, N2, N3, N4, and/or REM sleep, but may also comprise general descriptions of user states such as being awake, transitional phases (e.g., based on percentages of alpha, beta, theta, gamma, and/or delta brainwaves), a relative amount of time associated with such stages, micro-events within the stage of sleep such as a cortical arousal, apneas (central and obstructive), hypopnea, k-complex, sleep spindles, indicators of bedwetting, a cardiovascular event like a heart attack, a nightmare, a state of insomnia and/or any other user state. Based at least in part on a phase or stage of sleep a desired valence association, user state, or a determined quality of sleep, one or more actions may be performed. Such actions may be determined to improve a quality of sleep, promote transitioning to a different phase of sleep, induce a valence association, contact a medical professional, reduce snoring, prevent bedwetting, or the like. In at least some examples, actuation may be performed by one or more of the smart phone 102 or the nearable device 104 sending a signal over a wired or wireless communication protocol to one or more actuators. As illustrated in FIG. 1A, such communication may comprise wireless transmission 116 to one or more of the actuators. The wireless transmission 116 may be over WiFi, Bluetooth, near field communication, RFID, or otherwise.

As depicted in FIG. 1A, such actuators may comprise a light 118 to control a level of ambient light proximate the bed 106, wherein the light can also be attached to the nearable enhancement device in order to more accurately provide a dosage of light to the user during their falling asleep and waking up routines, and wherein the wearable enhancement device can be oriented such that the light is directed towards the left or right side of a bed in order to provide differential dosages of light to two sleepers on the same sleep furniture. Additionally, such actuators may comprise a thermostat 120 to control a temperature of a room in which the bed or sleep furniture 106 sits (e.g, controlling a Heating Venting and Air Conditioning system, a fan speed, etc.). This heating system can additionally be placed in the mattress in order to adjust the temperature of the mattress on the left or right side, accommodating different temperature needs of multiple users of the sleep furniture. Such actuators may also comprise a sound system 122 to play one or more sounds (music, nature sound, particular rhythms to induce a quality of sleep, stage of sleep, or valence association), or the like, and which can be similarly directed at a user on one side of the bed or another side. Though depicted as separate actuators in FIG. 1A, the description is not meant to be so limiting. Indeed, sounds may be played by speakers internal to one or more of the smart phone 102 and/or the nearable device 104. Other actuators may comprise one or more of additional speakers, lights, heating or cooling elements (e.g., heated blankets, Peltier coolers, etc.), transcranial direct current stimulation, electrical stimulation of other body parts, vibration stimulation, motors connected to window blinds to open/close the blinds, coffee machines (or other machines for preparing breakfast items), music or valence music based on user's history and personal preferences, aerosolizers for emitting fragrances, screens for depicting scenes for visual relaxation. In any of the above examples, signals sent to control the various actuators may be based at least in part on a biology of the user and adapt based on biofeedback, such as reducing the sound volume when heart-rate variability decreases, and include any combinations thereof for the aforementioned outputs/stimulations.

In at least some such examples, sensor data may be used to determine a physical state of the user such as the user being in pain, onset of a medical condition (e.g., heart attack, trouble breathing, etc.), snoring, or the like and respond accordingly. As several non-limiting examples, the nearable enhancement device (or other device accessible thereto) may cause a vibration in response to snoring or detection of back pain (e.g., by detecting muscle contractions using electromyography, tracking user's position, and/or detecting the user's phase of sleep) in order to cause the user to roll over. In response to more serious conditions, such as a heart attack, seizure, or the like, the device (or device accessible thereto) may initiate a communication with first responders or others (e.g., by dialing 911, a relative or designated party, etc.) and provide an indication of the detected event, as well as attempt to engage with the user when disarray is detected. The communication may be kept persistent until help arrives.

Similar processes and techniques to those described herein can be used for cognitive behavioral therapy. In some examples, in addition to measuring sleep, data collected via the nearable or nearable enhancement device may be used to categorize people into different phenotypes of insomnia, sleep apnea, or the like. As a non-limiting example of such, data available to the nearable or nearable enhancement device may be used to determine that an associated user is having trouble falling asleep and may deliver a stimulus (e.g., light, sound, temperature, etc.) to remediate the insomnia (e.g., relaxing music or otherwise). In those examples in which apnea is detected while sleeping, the device may deliver a stimulus to promote the user to roll over when an apnea instance. Such stimulations may be adjusted based on feedback from continued measurements until a successful intervention is determined.

Further, such sensors may be used to determine that nearable enhancement device 104 is optimally positioned to observe a user over the course of a sleeping session. For example, a camera system associated with the nearable enhancement device 104 (e.g., one coupled to the smart phone 102) may determine a position of the user in the bed 106 relative to a center of the camera. Based at least in part on the relative position, one or more motors (e.g., servos, stepper motors, etc.) may adjust one or more of a position or orientation of the nearable enhancement device 104 (and associated smart phone 102 of FIG. 1A) to ensure optimal visibility of the user in the camera. Similarly, in at least some examples (and not depicted in FIG. 1A) based at least in part on the relative position of the user to the nearable device 104, one or more similar motors may adjust the relative position of an acoustic amplification component to optimize sound played by the nearable device 104 (and/or the smart phone 102) to be heard by the user.

As will be discussed with respect to one or more of the additional figures below, additional or alternate components may be coupled to the nearable device 104 to promote better sleep quality, as well as to enhance detection and determination of sleep phase, or otherwise induce a higher quality of sleep, different sleep phase, or valence state association.

Figure 1B:
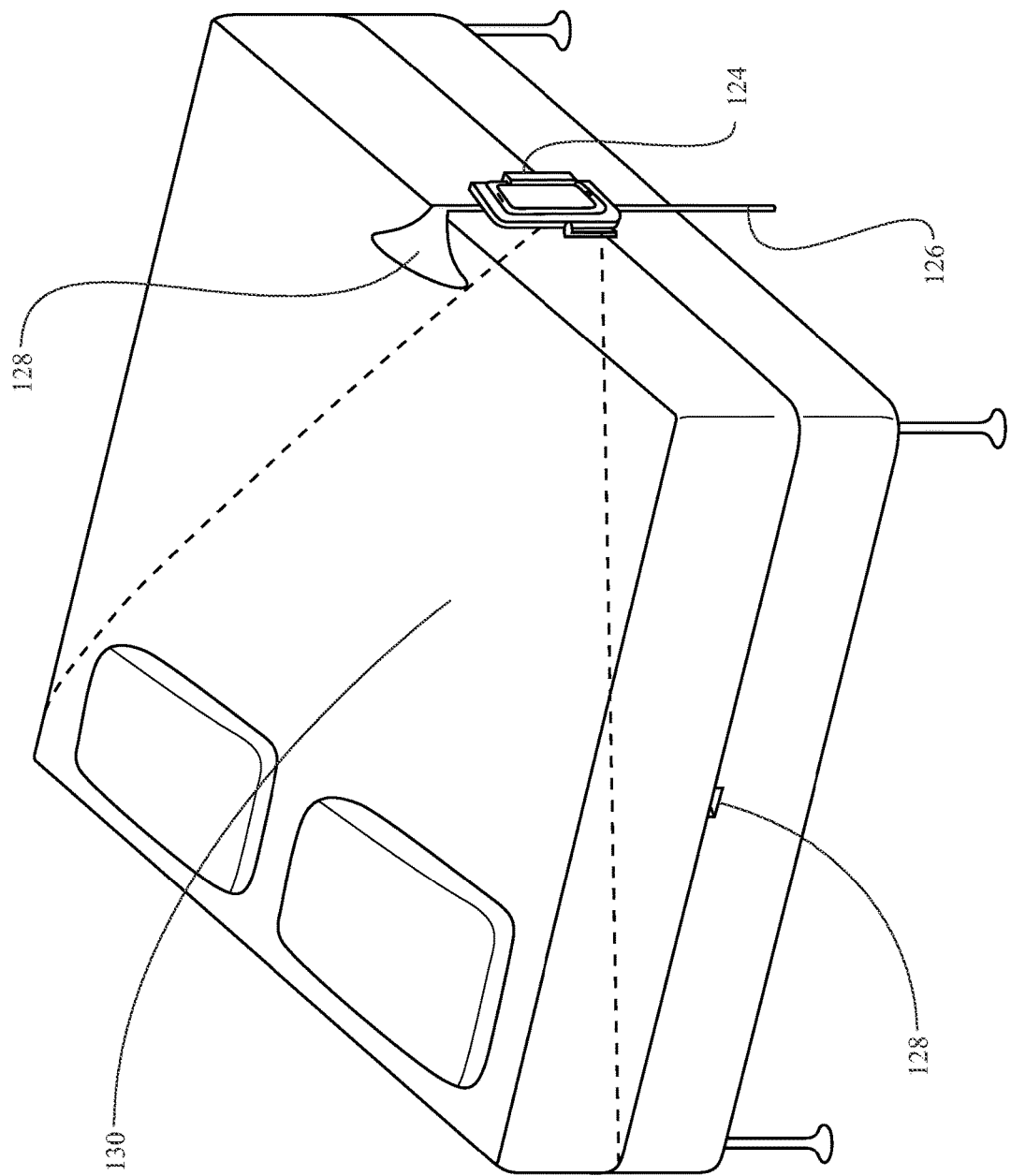
FIG. 1B depicts another example nearable device as may be coupled to a bed.

FIG. 1B illustrates another example of how a smart phone may be coupled to a bed. In various examples, such a coupling may be at any one or more of a foot, head, or sides of a bed. In at least some examples, such a coupling may be configured to fit multiple sizes of beds and/or be placed so as to detect or interact with multiple persons in a bed. As illustrated, smart phone 102 may be inserted into a cradle 124 which, in at least some examples, may further comprise an acoustic amplification component 128 as described in detail herein. In at least some examples, the cradle 124 may comprise one or more legs, such as leg 126. The leg 126 allows the smart phone 102 as held by the cradle 124 to rotate in order to display messages, provide directional acoustics, and the like as described in detail herein. In various examples, the cradle 124 may be coupled via one or more coupling points 128 positioned about the bed. Such a coupling point 128 allows for a mechanical and/or removable position to which the cradle 124 may be attached. In at least some such notch or coupling positions, viewing and/or auditory signals from the nearable device may be preferred.

As briefly mentioned above, at least some examples may further comprise a deformable membrane 130 attached to the bed and to the cradle 124. The deformable membrane 130 may be of an elastic material such that when a user lies in the bed, deformations in the deformable membrane 130 cause the cradle 124 to rotate about the leg 126. In such examples, motion of a user (either when getting into bed and/or during sleep) may mechanically cause the nearable device (e.g., the cradle 124 coupled with the smart phone 102) to orient in a direction optimal for delivering audiovisual signals. Though not depicted, any other sensor, actuator, data transfer, or power delivery mechanism is contemplated with respect to the example illustrated.

In those examples in which multiple persons are in a bed, the location where the device is coupled may provide information with respect to a relative position (or change of relative position) between the users and/or be positioned so as to determine the position or change of position of a single user. In various examples, changes in rotation, tension, or the like may be measured (e.g., based at least in part on a sensor, a measured rotation, pressure, or the like) to estimate a number of persons and/or animals in the bed and such data may be used in any example described herein.

Figure 2:
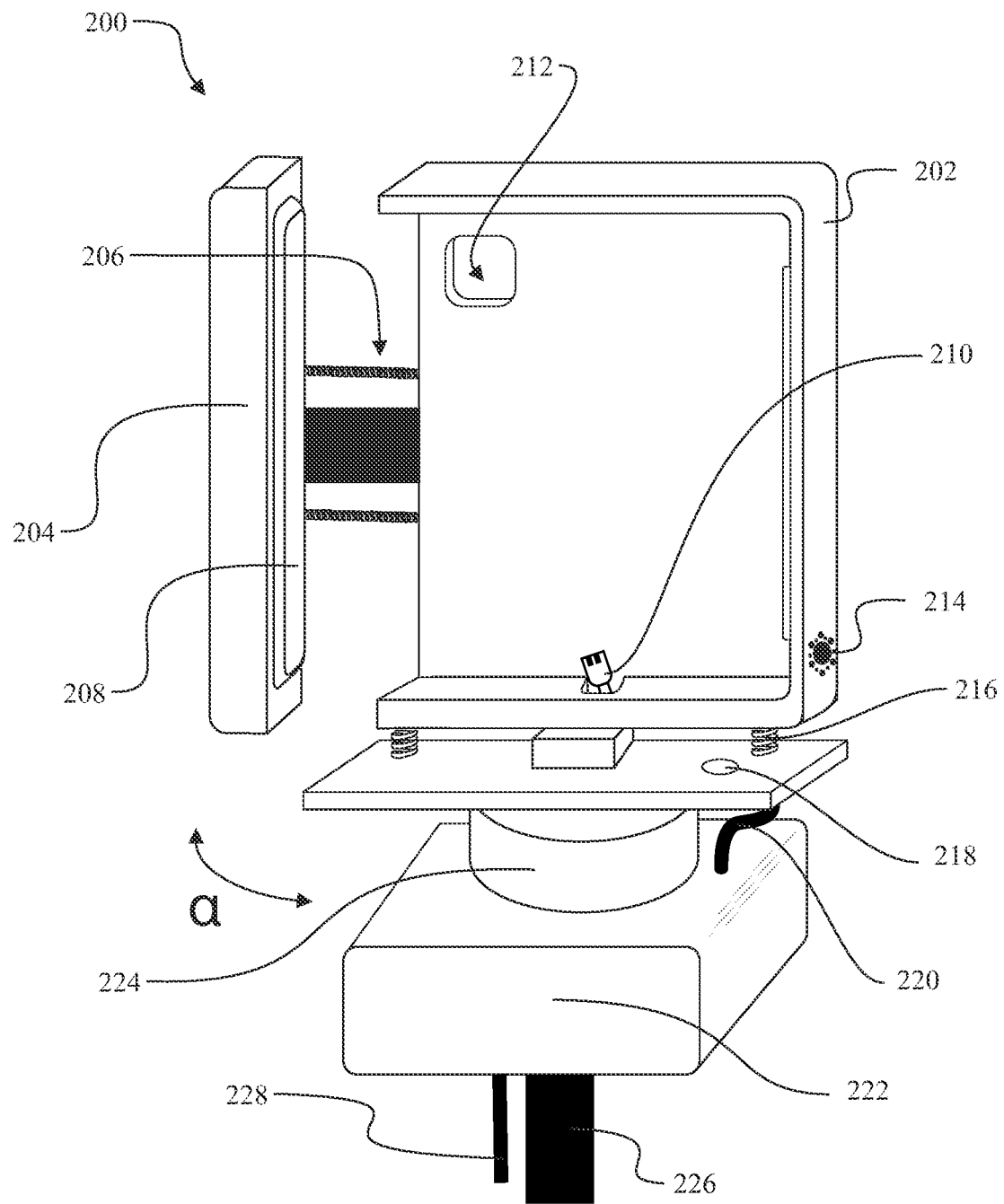
FIG. 2 depicts an example of the nearable device described herein depicting a cavity for receiving a smartphone or other electronic device with sensor inputs and/or outputs.

FIG. 2 represents an example nearable enhancement device 200. As illustrated, the nearable enhancement device 200 comprises a housing 202 configured to receive a smart phone. The housing 202 may differ from model to model of smart phone and/or be adaptable to hold a plurality of smart phones. The housing 202 may mate with an arm 204. The arm 204 may align with the housing 202 and be kept under tension by alignment and tension component 206. As illustrated the alignment and tension component 206 may comprise one or more springs and one or more guides which keep the arm 204 disposed to be in tension with housing 202. To promote a smart phone being ruggedly fixed within the housing 202, one or more friction pads 208 may be affixed (or adhered to) one or more of the arm 204 and the housing 202 to ensure (in addition to the tension applied by the alignment and tension component 206) that any smartphone inserted into the housing 202 remains static. In an additional nonlimiting example, the smart phone may sit on top of the nearable enhancement device and be secured to it via the pressure of gravity alone, or with the further assistance of a closure for the smart phone to be secured within a wireless charger.

A connector 210 may allow the smart phone inserted into housing 202 to receive power for charging and/or to transmit data to and from one or more additional processors and memory of the nearable device 200. Of course, in additional or alternate examples, one or more of power and/or data may be transmitted/received wirelessly (e.g., via wireless power transfer, Bluetooth, WiFi, near field communication, etc.).

An aperture 212 may allow for a camera (or one or more additional sensors) of a smart phone inserted into housing 202 to continue to capture data of the environment despite the smart phone being placed into the housing 202. Additionally, the side of the nearable enhancement device that includes the aperture 212 may comprise a wireless charger so there is no need for a connector 210 that is designed to charge the phone to be included in the example, in additional to more universal charging of a smart phone.

As described in detail herein, the nearable device 200 may also comprise an acoustic amplification component 214. As illustrated in FIG. 2, such an acoustic amplification component 214 may comprise a series of openings in the housing 202 proximate to a speaker location of an associated smart phone held in the housing 202. In additional or alternate examples, the acoustic amplification component 214 may be shaped and/or dimensioned to enhance a volume and/or quality of sound from a speaker of one or more of the nearable device 200 or the smart phone. In various examples (not depicted in FIG. 2), the acoustic amplification component 214 may be adjustable (either manually and/or by one or more motors coupled thereto) such that sound emitted from the acoustic amplification component 214 is optimally output to a user while sleeping (e.g. directed at the right or left side of the bed in order to accommodate multiple sleepers and to measure a precise dosage of sound that is directed at the intended user). In one an example of an example, different openings in the housing 202 can be manually shut or open by the user with a slidable material that covers the openings (e.g., a variable aperture). These covers that shut and close can alternatively be used to block the camera in order to promote privacy or create a lens over the camera that enables for the ability to detect light in the room from the camera without recording personally identifiable information.

The housing 202 may be suspended by one or more springs 216 above a base 222. The one or more springs 216 may provide a force to react to a user pressing down on the nearable device 200. In such an example, accelerometer sensors in the smart phone can be calibrated to specific actions with the user to form a type of motion communication language between the user and the nearable enhancement device (e.g. a firm push down motion on the device would snooze it for longer than a lighter push down of the device when an alarm clock sounds in the morning). Once pushed down sufficiently far, the housing 202 may lock into a portion of the base 222 via a releasable locking mechanism (e.g., a solenoid lock, clasp, or the like). A proximity sensor 218 may detect the housing 202 being proximate the base 222. In various examples, the proximity sensor 218 may comprise, for example, a Hall effect sensor, a contact sensor, or the like. In various examples, the springs 216 may form part of an alarm system whereby at a given time, the locking mechanism is released allowing the housing 202 to move away from the base 222. In such examples, the alarm may continue until a user depresses the housing 202 back into the locking mechanism. In various examples, the nearable device 200 may comprise a compartment for holding a fragrance. In at least some such examples, compressing the one or more springs 216 (e.g., by pushing down on the housing) may cause release of the fragrance (e.g., by discharging an atomizer, aerosolizer, or the like). Of course, in additional or alternative examples, fragrances may be released by one or more actuators controlled by the nearable device 200 throughout the course of a sleeping session to promote a stage of sleep, quality of sleep, or otherwise induce a valence association.

In at least some examples, a signal from the proximity sensor 218 may further be used to engage a sleep sequence (e.g., start a program to promote sleep) including a sequence of audio, visual, olfactory, or other signals from the nearable device 200 and/or associated sensors and actuators. Such a sequence is explained in further detail herein.

In various examples, the housing 202 may also be made of materials to reduce and/or eliminate an amount of electromagnetic fields proximate the nearable device 200. For example, the housing 202 and/or arm 204 may comprise a metallic mesh to reduce or eliminate electromagnetic fields of an inserted smartphone. Such reduction or elimination may promote/enhance a quality of sleep of a user.

In the example shown in FIG. 2, a screen of an inserted smart phone may still be visible and can be responsive to touchable interactions—despite being in the nearable device 200. In this example, messages, lighting, or otherwise may be communicated to a user via a screen of the smart phone. In some example, though not depicted in FIG. 2, the neck 226 can be adjusted and oriented such that the user can read their smart phone or nearable device (i.e. a tablet or Kindle) while they are laying down in bed.

A cable 220 may connect to the nearable enhancement device and may provide one or more of data or power to components of the nearable device 200 from the base 222. In various examples, the cable 220, may terminate at connection 210, though any other combination of connections for data and/or power is contemplated.

In various examples, and as illustrated in FIG. 2, the nearable device 200 may comprise one or more rotatable components 224. The rotatable component 224 may alter one or more of a position (e.g., an x-, y-, or z-position) and/or an orientation (any one or more of a roll, pitch, or yaw) of the nearable device 200 in response to data from one or more sensors associated with (or accessible to) the device. As depicted in FIG. 2, the rotatable component 224 may rotate the nearable device though a range of angles, alpha. As a non-limiting example, a position of a user may be detected in an image captured by a camera associated with a smart phone placed into housing 202. Based at least in part on the relative position of the user, the rotatable component 224 may change the position and/or orientation of the nearable device 200 to center (or otherwise optimize) the position of the user in the camera image. Of course, the nearable device 200 may be positioned or oriented based at least in part on any other sensor, time of day, or otherwise to optimize sensor data, enhance audio from the acoustic component 218, or otherwise.

The base 222 may further comprise one or more processors (as described in detail herein), memory, speakers, screens (such as touch screens, LCDs, LEDs, or the like), sensors, and the like. In some examples, such as shown with respect to FIG. 1A, the base 222 may access one or more additional sensors and/or control one or more actuators via a wired and/or wireless communication. Base 222 may be supported by a semi-rigid and flexible neck 226. Neck 226 may be flexible to allow a user to provide initial (or manual)

positioning of the nearable device 200, yet rigid enough to remain in such a position and/or orientation throughout a sleep session. In various examples, the neck 226 may allow a user to read (or otherwise use the associated device) while in bed, direct sound to a particular person in the bed (and not the other), or direct sound about the room by manually adjusting the position and/or orientation. Such a flexible neck 226 may be used in any of the examples discussed herein, including without limitation the example of FIG. 1B. Of course, in some examples (such as the that illustrated with respect to FIG. 1A), the nearable device 200 may be coupled to furniture (such as a bed frame) by clasps, clamps, screws, fasteners, or the like, or otherwise be integrally formed with the furniture. Power may be provided to base 222 via power cable 228, though any other method of power.

Figure 3:
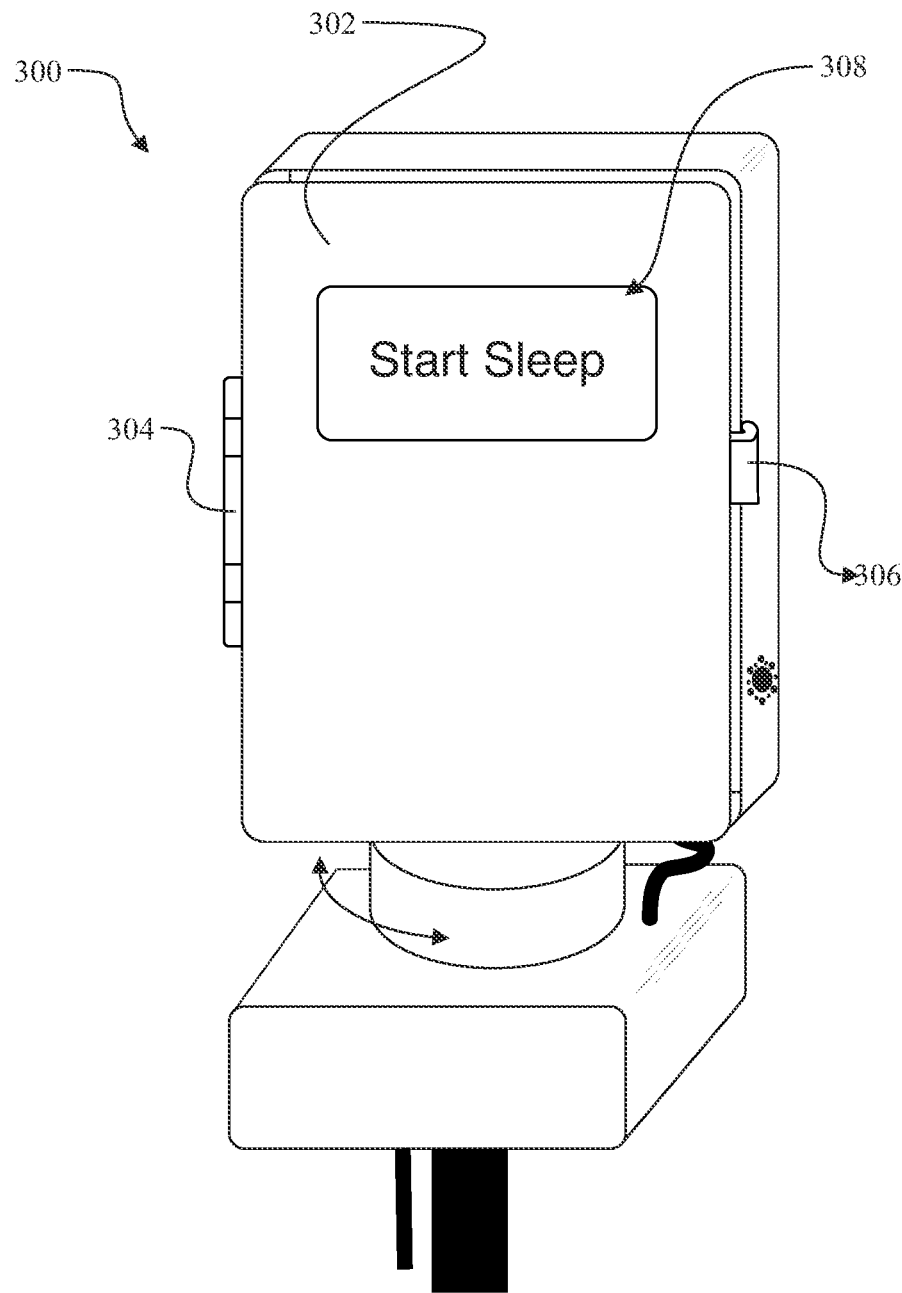
FIG. 3 depicts another example of a nearable having a hinged cover.

FIG. 3 presents an alternate example nearable enhancement device 300. Nearable enhancement device 300 is similar to the nearable enhancement device 200 depicted in FIG. 2 and, for brevity, the similar components illustrated will not be called out in detail. Of note with respect to the nearable device 300, an additional cover 302 is provided. The cover 302 may comprise a hinge 304 and/or a clasp 306. The hinge 304 may comprise a living hinge, a butt hinge, a spring hinge, or the like to allow the cover 302 to rotate from an open to a closed position. The clasp 306 may be magnetic, electromagnetic, mechanical, or the like so as to releasably hold the cover 302 in a closed position. In at least some examples, such a nearable device may not comprise the arm and alignment and tension component depicted in FIG. 2, as the cover 302, hinge 304, and clasp 306 may be sufficient to hold a smartphone in the housing.

The cover 302 may be formed of a material to block excess electromagnetic radiation from a smart phone placed within the nearable device 300, as in the example nearable device 200. The cover 302 may further operate to block excess light from the smart phone when placed inside (e.g., from a screen of the smart phone). Furthermore, it can be used to direct light or sound to different locations in the bedroom. Lastly, it can be made more or less difficult to open based on a user's preferences, level of fatigue, or issues with using their technology at night, when they should be sleeping. Removal of the excess light may, in various examples, promote sleep of a user by reducing distractions, as well as making it more difficult to access the smart phone which may, in those examples, reduce or negate addictive or habitual use of the smart phone and further promote rest and enhanced sleep. In various examples, such as the one shown in FIG. 3, the cover 302 may comprise an aperture 308. Though a majority of the screen may be covered by cover 302, the aperture 308 may allow a portion of the screen to remain visible. Such a portion may be used to display messages, to provide a window for a camera, or illuminate an area with colors to promote sleep, enhance a quality of sleep, transition a stage of sleep, or otherwise induce a valence association.

Figure 4A:
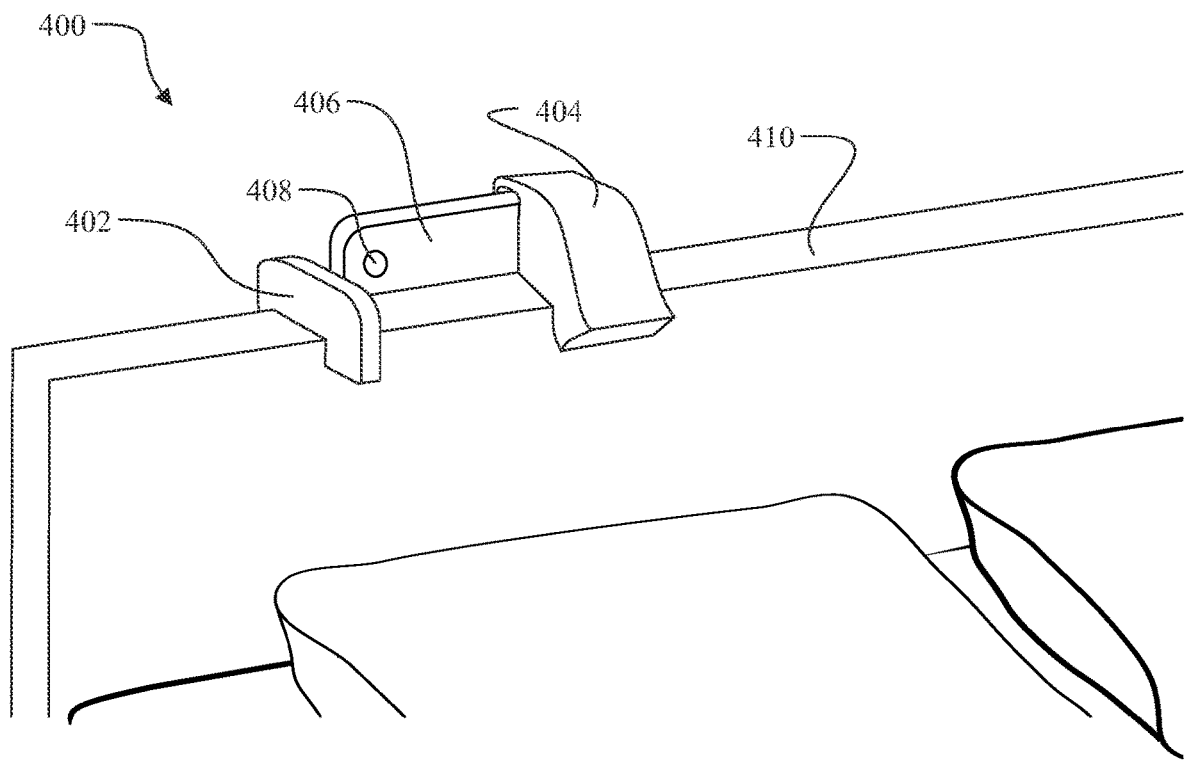
FIG. 4A illustrates another example of a nearable device.
Figure 4B:
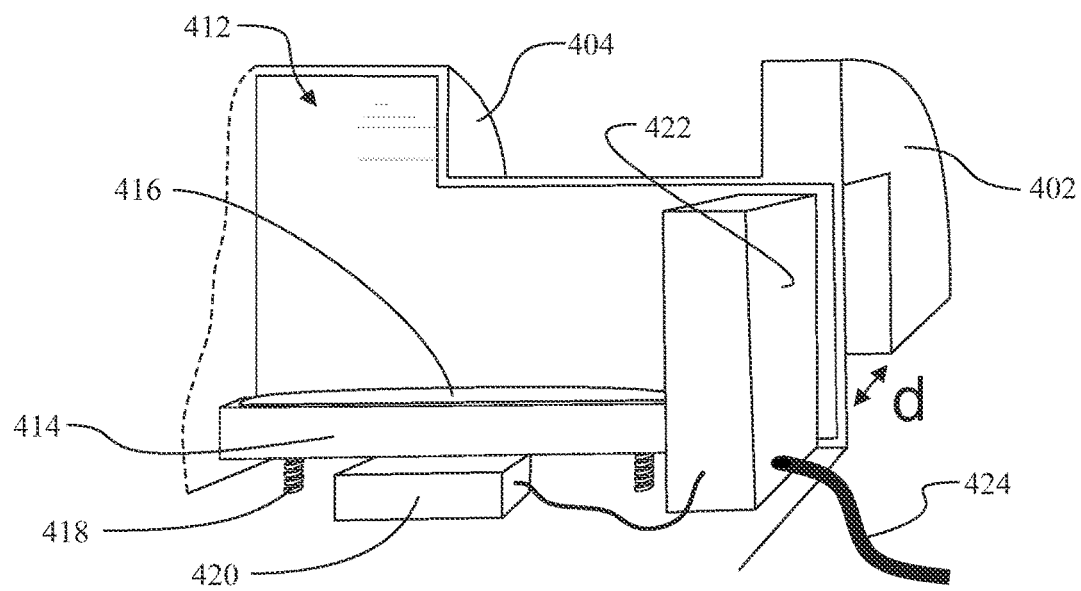
FIG. 4B illustrates a side view of the example nearable device of FIG. 4A.

FIGS. 4A and 4B illustrate another example nearable enhancement device 400. In such examples, the nearable enhancement device 400 may hook over a bed frame 410 via a first arm 402 and/or a second arm 404. The first arm 402 and the second arm 404 may provide support for the nearable enhancement device 400 to be hung from the bed frame 410. In such an example as depicted in FIG. 4A, a smartphone 406 may then be inserted into a recess of the nearable 400. When inserted, the smartphone 406 may be positioned within the nearable device 400 such that a camera 408 (and/or other sensors available to the smartphone 406) are able to receive information and are not otherwise blocked. A speaker of the smartphone 406 may be positioned proximate the second arm 404 such that an acoustic amplification component within the second arm 404 is able to amplify any speaker signals and direct the signals at a specific location or user in the room. Similarly, by positioning the smartphone 406 in the nearable device 400 in such a manner, any visible light from a screen of the smartphone 406 may be minimized. As above, the nearable device 400 may be made of a material to eliminate or reduce an amount of other electromagnetic radiation from a smart phone placed within (e.g., comprising a metallic mesh of suitable mesh size). In such examples, the sensor data collected from the smart phone could be analyzed locally on the device, since cloud-based services would not be made available until the smart phone is placed outside of the nearable enhancement device, when additional analyses from can be performed. In still further examples, a preprogrammed wakeup can be set on the nearable enhancement device to open the chamber to again receive electromagnetic signals for accessing additional devices in the room, such as smart lighting for promoting a more pleasant waking up experience. The smart phone may couple via one or more wired and/or wireless connections to the nearable device 400 such that the nearable device 400 may use any one or more of processors, sensors, actuators (e.g., screen, speaker, vibratory elements, etc.) of the smart phone and/or provide power to the smart phone. In other examples, such a coupling may allow the smart phone to access one or more of processors, memory, sensors, or actuators of (or accessible to) the nearable device 400.

As shown in FIG. 4B, such a smart phone may be placed in the nearable enhancement device 400 sideways such that a screen of the phone is facing away from a bed and an associated camera of the smart phone 406 is overlooking the bed. The first arm 402 and the second arm 404 may form a gap having a distance "d" between a surface of the arm and a surface of a body of the nearable device 400. Such a distance, "d," may be sized and shaped so as to fit over a specific headboard, over a range of headboards and/or otherwise be adjusted in examples in which the first and second arms 402 and 404 are adjustable. As such, the first and second arms 402, 404 may support the nearable device 400 when placed on, for example, a headboard 410.

As described above, the second arm 404 may comprise an acoustic amplification component. In some examples, the acoustic amplification component may be active (e.g., having one or more amplifiers) and/or actively move via a device like a motor so as to best track a user during a sleeping session. However, as depicted with respect to FIG. 4, such an acoustic amplification component may, in additional and/or alternative examples, be static and rely on mechanical properties for acoustic amplification. As shown, a curved cavity 412 is formed in the second arm 404. Such a curved cavity 412 is positioned and formed in such a manner that a smart phone 406 placed proximate the curved cavity 412 will amplify or increase a quality of sound from an associated speaker amplified (e.g., via resonance, or otherwise). Of course, in those examples in which the nearable enhancement device 400 comprises a speaker, such a speaker may be built into, or otherwise enhanced by, the cavity 412 formed within the second arm 404, and further enhanced by additional speakers located in the room of the sleep enhancement device.

As in other examples described herein, a smart phone 406 may be placed onto a deck 414. In FIG. 4B, the deck 414 may comprise a friction surface 416 (e.g., a friction pad) to reduce an amount of movement of the smart phone 406 when placed inside the nearable device 400. To further limit movement of the smart phone 406, a length an interior of the nearable device 400 may be dimensioned so as to limit movement and/or comprise additional friction surfaces.

Similar to other examples, such an example nearable device 400 may comprise one or more springs 418 which couple the deck 414 to a body of the nearable device 400. The springs 418 may resist a weight of the smart phone 406 and well as a force used to depress the smart phone 406 into the nearable device 400. A latching mechanism 420 may hold the smart phone 406 when depressed. Such a latching mechanism 420 may comprise one or more proximity sensors (not illustrated), such as Hall effect sensors, pressure sensors, etc., to determine when the deck 414 has been depressed. A signal of which may be indicative of the smart phone 406 being placed into the nearable device 400 and/or depressed to a maximum level. The latching mechanism 420 may keep the deck 414 in a locked position physically (e.g., a latch, clasp, etc.), electromagnetically (e.g., a solenoid, electromagnet, etc.), or the like. Such a latching mechanism 420 may be used to achieve the same or similar functions as described with respect to FIG. 2 (e.g., alarm, fragrance release, initiation sequence, etc.). For example, when a first signal of the proximity sensor is received, the nearable device 400 (and/or the associated smart phone 406) may receive the associated signal and cause an initiation sequence to begin. An alarm may cause the latching mechanism 420 to release the smart phone 406 and sound an alarm until depressed. In some examples, a fragrance may be released or a light bulb triggered with the springs 418 are compressed and/or the proximity signal is detected.

As in other examples, the nearable device 400 may comprise one or more processors, memory, communication components, sensors, and/or actuators any one or more of which may be housed in housing 422. The sensors may comprise accelerometers, gyroscopes, proximity sensors, microphones, temperature sensors, light sensors, etc. as described herein. Actuators may comprise, for examples, vibrational elements, speakers, screens or displays, atomizers/aerosolizers for release of fragrances, the latching mechanism 420, or the like as otherwise described herein. Further, the nearable enhancement device may access one or more additional sensors and/or actuators remote therefrom via one or more wired and/or wireless communications (including those sensors and actuators associated with smart phone 406). Such a housing 422 may receive power and/or data via a cable 424. In some such examples, the nearable enhancement device 400 may provide at least a portion of power to the smart phone 406.

Figure 5:
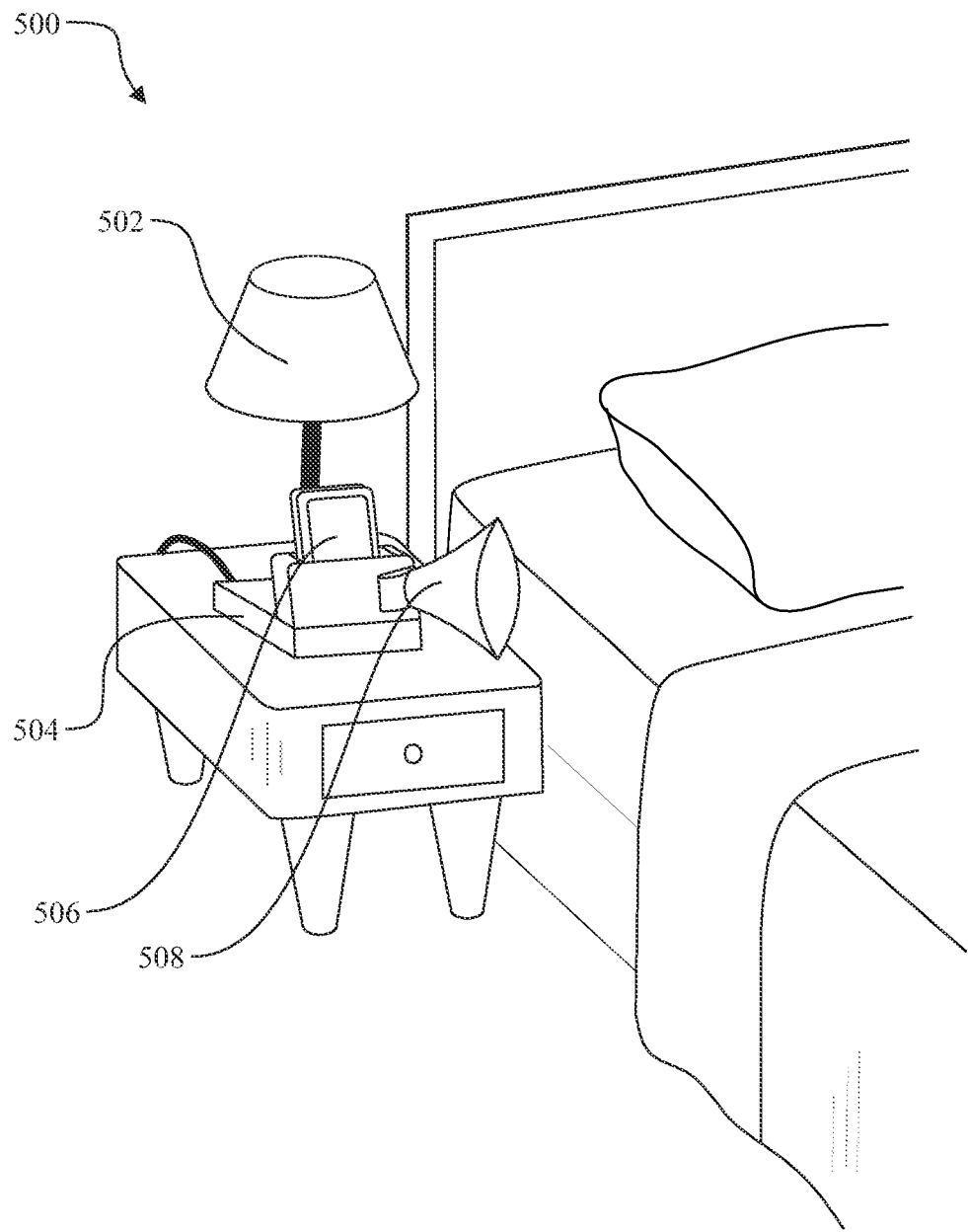
FIG. 5 depicts yet another example of a nearable device in which the device is coupled to a lamp.

FIG. 5 depicts yet another example of a nearable device 500. As described above, the example nearable device 500 may be integrated with a piece of furniture (e.g., bed, chairs, or otherwise). As depicted here in FIG. 5, such a nearable device 500 may be formed integrally with a lamp 502. The lamp 502 may comprise a base 504. In some examples, such a base 504 may comprise a power source (e.g., a battery, connections to external power, or the like), one or more processors, memory, sensors, actuators, communication components, support circuitry, or otherwise which, in at least some examples, may couple (wirelessly or via a wired connection) to a smart phone as described in detail below. In additional or alternative examples, the base may be completely passive and only provide mechanical components (which may comprise elements for reducing or inhibiting electromagnetic radiation from a smart phone placed within).

As shown in FIG. 5, such an example nearable device 500 may be configured to receive a smart phone 506. Though illustrated in FIG. 5 as having a screen exposed when inserted, in additional or alternate examples such a smart phone 506 may be inserted into the base 504 such that the screen is facing away from a sleeping place of a user and further such that a camera associated with the smart phone 506 is facing and exposed to the user. The base 504 may be sized and shaped to receive the smart phone 506 in a recess or cavity therein (which may be similar to those discussed in detail above) and comprise one or more of wired and/or wireless communications for relaying power and/or signals between the smart phone 506 and the nearable device 500. In various examples, such signals exchanged between the smart phone 506 and the nearable enhancement device 500 may include, but are not limited to, sensor data from one or more sensors accessible to the smart phone 506 (e.g., cameras, iris scanners, thermal imagers, microphones, pressure sensors, accelerometers, gyroscopes, magnetometers, and the like), actuators (e.g., vibrational elements, screens, speakers, and the like), communications components, processors, memory, or otherwise. As in other examples herein, such a nearable device 500 may further comprise springs, proximity sensors, atomizers and/or aerosolizers (e.g., for releasing fragrances), etc. As above, additional sensors, actuators, computer systems, processors, memory, etc. (e.g., those remote from the base 504 and apart from those of the smart phone 506) may be accessible to the nearable device 500 over one or more of a wired and/or wireless communication, such as all of those sensors, actuators, processors, systems, etc. described in detail with respect to FIG. 1.

As shown, the smart phone 506 may nestle into the base 504 of the nearable device 500 while leaving at least a portion of a screen of the smart phone 506 exposed, though any portion is contemplated (e.g., from no coverage to full coverage). In the example illustrated, the nearable enhancement device 500 may block at least a portion of the visible light from the screen to promote sleep while leaving a portion for displaying messages to a user, or could alternatively have an adjustable cover to direct light that could be omitted from the nearable. As in other examples, such a nearable enhancement device 500 may be formed of material, or otherwise designed in such a way, to inhibit or reduce an amount of electromagnetic radiation of the smart phone 506 including materials such as plastics and the like impregnated with metallic meshes to create a Faraday's cage effect.

Though not illustrated in FIG. 5 for clarity and as described in detail herein, the base 504 may rotate relative to the lamp 502 based at least in part on sensor data from the one or more sensors available to the nearable device 500 and/or the smart phone 506 in order to optimize sensor readings and outputs with respect to a user sleeping proximate the nearable device 500. For example, the base could rotate such that an amplified speaker from the nearable is directed towards one area of the room for enhancing a particular user's sleep. Light could also be directed in such a manner at the right time in the user's circadian rhythm in order to entrench this rhythm and make it stronger.

As illustrated in FIG. 5, the nearable device 500 may further comprise an acoustic amplification component 508. The acoustic amplification component 508 may be sized, shaped, and placed so as to mechanically, electrically, and/or electromechanically enhance (increase a volume, quality, etc.) of sounds emitted from one or more of the smart phone 506 and/or from one or more other speakers associated with the nearable device 500. Such an acoustic amplification component 508 may be static (e.g., be immobile with respect to the nearable device 500). In other examples, such as shown here in FIG. 5, such an acoustic amplification component 508 may change an orientation via one or more actuators associated with the nearable device 500 to provide an optimal sound during sleep based at least in part on sensor data from one or more sensors accessible to the nearable device 500 and/or the smart phone 506. As a non-limiting example, a position of a user in an image generated by an image capture sensor may determine a relative position of the user to the nearable device 500. Here, the acoustic amplification component 508 may be oriented to optimize the sound received during the user. In such examples, the sounds produced via the acoustic amplification component 508 may be configured to one or more of enhance a quality of sleep, promote a phase of sleep, induce a valence association, or the like.

As in other examples, when the smart phone 506 is introduced into the base 504, a proximity sensor associated with the nearable device 500 may detect the presence of the smart phone 506 and initiate a calibration and/or sleep sequence as described in detail herein, especially with respect to FIGS. 6 and 7 below.

Figure 6:
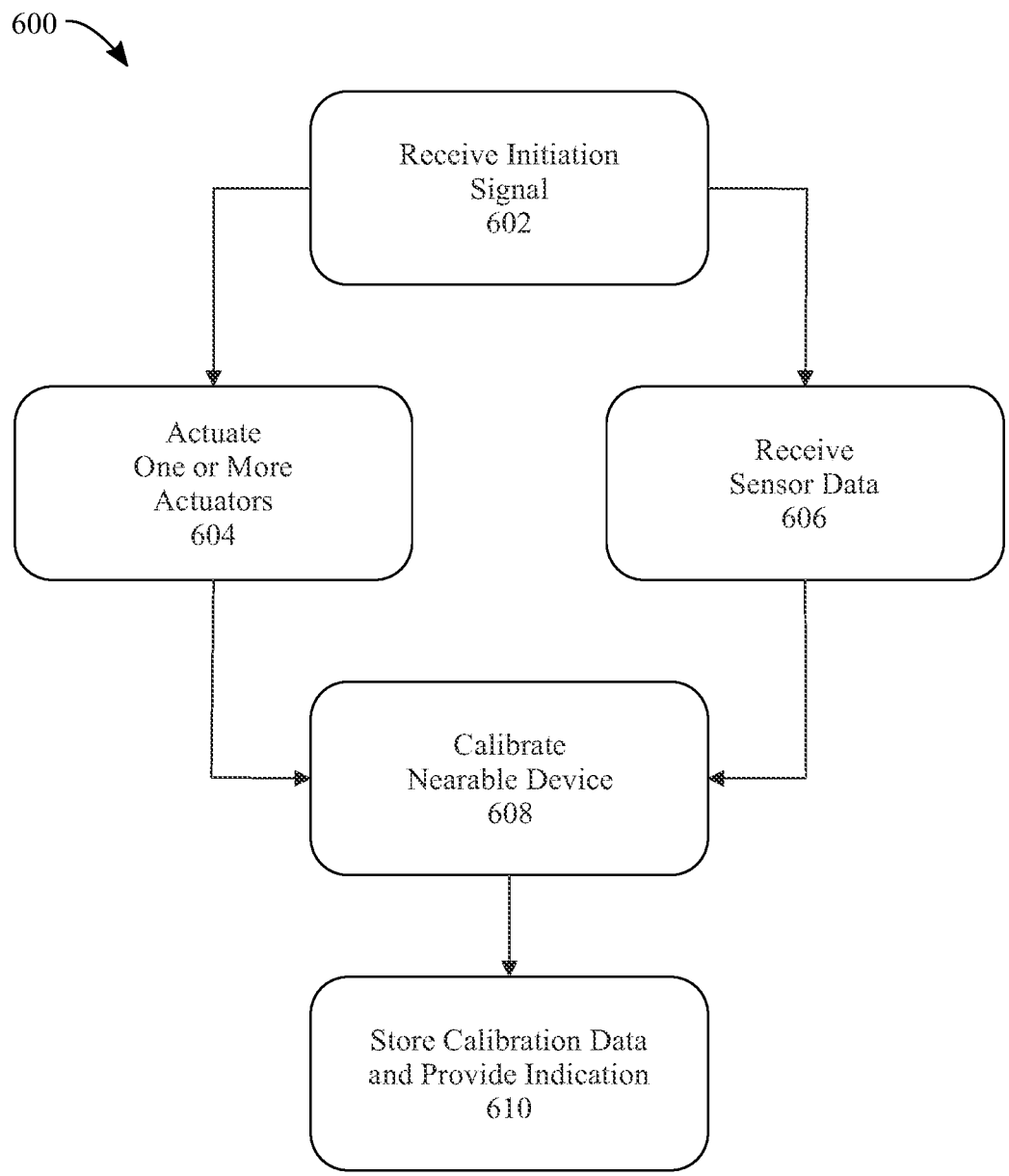
FIG. 6 depicts an example flow diagram for calibrating the nearable device.
Figure 7:
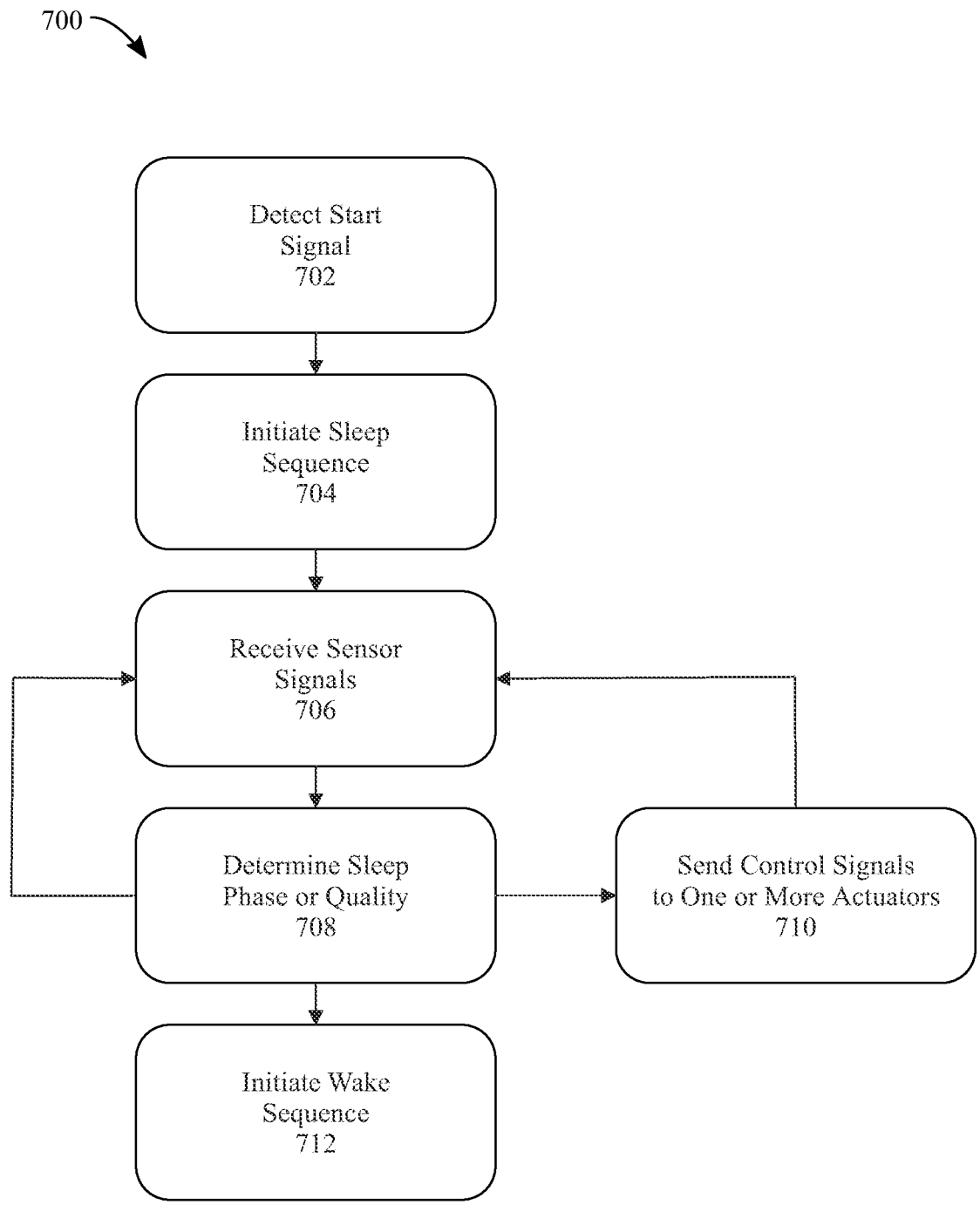
FIG. 7 depicts an example flow diagram for monitoring and tracking sleep.

FIGS. 6-7 illustrate example flow diagrams representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e. within technical tolerances of processors, etc.) to perform the operations described herein. Further, in those systems with more than one blade, the following operations depicted in any of the flow charts herein may be performed based on any one or more blades.

Calibration Procedure

FIG. 6 illustrates an example flow 600 for calibrating a nearable device. Such a flow may begin at 602 in which one or more of a button, command, or other signal is sent indicating that the nearable has been placed and is ready to begin calibration.

At 604, one or more actuators accessible to the nearable device may be actuated. As a non-limiting example, one or more vibrational elements, motors (e.g., servos, stepper motors, etc.), or the like may cause the nearable device to vibrate, rotate, and/or change position. In various other examples, any other actuator accessible to the nearable device may be actuated (e.g., lighting, HVAC units, fans, etc.). Such positional changes can be detected by the accelerometer processor of the smart phone in order to determine the precise location of the smart phone in the nearable enhancement device. In yet another example placing the smart phone in the sensor may initiate a sequence of sounds via a speaker on the sleep enhancement device in order to integrate with a smart assistant in the bedroom like Amazon's Alexa or to play sounds to again confirm that the device is in the appropriate position of the nearable enhancement device and the data collected across devices are synced. Such pre-recorded sounds in the sleep enhancement device could be adjusted and customized by the user and could express the command to the smart phone at a lower volume than if the user would to audibly speak the command into their smart phone. This is beneficial to reducing bedtime disturbances for the user's sleep partner.

At 606, one or more sensors accessible to the nearable device (whether coupled wired or wirelessly, proximate or remote therefrom, etc. including, but not limited to, sensors of a smart phone coupled to the nearable device, sensors remote from the nearable device or smart phone but accessible over one or more of a wired or wireless coupling, or the like) may generate sensor data and make such sensor data available to the nearable device. As non-limiting examples, such sensor data may include, but is not limited to, images from cameras (which may include one or more image fiducials (QR codes, Augmented Reality tags, image calibration sheets, etc.), measured temperatures, measured ambient light, accelerometer data, gyroscope data, WiFi beacon data, and the like.

At 608, one or more processors accessible or proximate to the nearable device may receive such sensor data and calibrate one or more sensors accessible to the nearable device and/or the nearable device itself. As non-limiting examples, image data described in detail above may be used to determine one or more of extrinsic (e.g., position and/or orientation) and/or intrinsics (e.g., internal operating parameters) of a camera and, when coupled with accelerometer or gyroscopic data, may be used to provide visual-inertial calibration. This calibration step could also be enhanced by historical health data collected from a web or smart phone interface on the user, and which could also include personalized preferences of the user, such as ideal bedtime and wake up time. Such preferences could also be set by a third party, like the user's doctor or coach. Extrinsic calibration of the nearable device may further be used to calibrate one or more of the motors, HVAC controls, fan speed controls, and the like.

At 610, an audio and/or visual alert may be provided to a user to indicate that calibration is complete or to interface with a smart assistant in the bedroom, and any portion of such calibration data may be stored at one or more of the nearable device, the smart phone (if any), and/or a computer system remote therefrom.

Monitoring and Tracking

FIG. 7 illustrated an example flow 700 for monitoring and tracking sleep with a nearable enhancement device as described herein. At 702, a start signal may be detected indicative of a request to begin a sleep session. As described in detail above in those examples in which a smart phone is coupled to such a nearable device, such a signal may comprise an output of a proximity sensor (e.g., Hall effect sensors, Bluetooth, near field communication, pressure sensor, or the like) generated when the smart phone is coupled to the nearable device (either via a wired and/or wireless connection). Of course, in additional or alternate examples, such a signal may comprise a user pressing a button on one or more of the smart phone or the nearable device, image detection algorithms detecting the user getting into a bed, a verbal command (e.g., "start sleep") received from a user, or the like. In some examples, and as described in detail herein, inserting the smart phone into the nearable device may require pushing against a spring until a latch is actuated. In various examples, the latch may be held in place by one or more of a mechanical and/or electromagnetic signal. In at least some such examples, depressing the smart phone into the latching mechanism further causes a release of a fragrance (e.g., lavender or otherwise) to promote sleep and rest.

At 704, in response to the signal, a sleep initiation sequence may be commenced. For example, one or more processors accessible to the nearable device, smart phone, or computerized system remote therefrom may actuate one or more actuators in attempts to promote sleep. As non-limiting examples, a temperature for the room may be set (e.g., by one or more of a fan or HVAC, etc.), lighting may be adjusted (dimming or shutting lights, closing blinds, and the like), fragrance(s) may be emitted from one or more atomizers or aerosolizers, music may be played, or the like. In additional or alternate examples, a screen (or the nearable device and/or smart phone) may display messages, cause soothing lights to be emitted, or the like. Similarly, a speaker accessible to the nearable device (of the nearable device, of the smart phone, or of an audio system) may play one or more guided messages to promote the user falling asleep. In at least some examples, in response to the signal, a sound may be played to cause a smart phone to perform one or more actions. As a non-limiting example, the signal may cause an audio signal to be played which produces the sound "Hey Siri, going to bed" which, in turn, may cause the smart phone to perform one or more preprogrammed nighttime sequences.

At 706, sensor data of one or more sensors (or data sources) accessible to the nearable and/or the smart phone may be received. In various examples, such sensors may be coupled to the nearable enhancement device (whether via a wired and/or wireless coupling), accessible or coupled to a smart phone (if any), and/or accessible to (or otherwise remote therefrom) either the nearable device or the smart phone (e.g., embedded within smart watches, part of devices having an internet-of-things connectivity, via one or more servers—such as weather services, sunrise/sunset data, etc.). Such sensors or sources may comprise, for example, accelerometers, gyroscopes, magnetometers, actigraphy sensors, cameras, microphones, heart rate sensors, blood pressure sensors, electroencephalographs, electrocardiograms, infrared detectors, RFID temperature receivers, ambient light detectors, pressure sensors, temperature sensors, and the like.

At 708, one or more determinations may be made using the sensor data received at 706. As a non-limiting example, one or more of a phase of sleep (e.g., N1, N2, N3, REM, etc.), a quality of sleep (e.g., whether sleep is consistent, interrupted, durations of the multiple phases, etc.), or any other sleep metric may be determined. Such determinations may be made in accordance with those techniques described in either U.S. Pat. No. 10,524,661 entitled "Sleep Monitoring and Stimulation" filed on Jun. 12, 2014 and U.S. patent application Ser. No. 16/504,285 entitled "Valence State Memory Association" filed on Jul. 7, 2019, the entire contents of both of which are hereby incorporated by reference. As a non-limiting example, sensor data may be input into a machine learned model trained to determine a phase of sleep, though any other technique is contemplated. As described herein, coupling the one or more sensors to a bedframe, under a sleeping position of a user, or otherwise may enhance a level of a detection relative to other techniques as weaker signals, signals with lower signal-to-noise ratios, or the like may be used to make such a determination. In some examples, wearable sensors that are included in the system (e.g., worn by a user) may provide more enhanced levels of detection when used in addition to, or alternatively to, a smart phone connected to the bedframe, headboard, or mattress. In any of the examples discussed herein, historical data associated with multiple sensors may be stored (either at the nearable device or otherwise accessible thereto) to improve the predictions of various sleep metrics (sleep phase, quality, etc.).

In at least some examples, and as illustrated in FIG. 7, based at least in part one or more of the quality of sleep, phase of sleep, and/or sensor data, flow may proceed to 710 wherein one or more signals are generated to control one or more of the actuators. As non-limiting examples, such signals may comprise one or more of a signal to adjust a temperature of the room in which the user is sleeping, a lighting level or color of the room, a volume of sound played, a fragrance to be emitted, one or more transcranial stimulations (whether magnetic, direct current, or otherwise), or the like. Such control signals may be determined based at least in part on determining a level of certainty with respect to the sleep phase (as described in "Sleep Monitoring and Stimulation"), to induce a valence association (as described in "Valence State Memory Association"), or the like. In various examples, such control signals and/or valence states may be determined in accordance with events that occurred during the day as may be available to the nearable or nearable device such (as described in "Valence State Memory Association").

In various examples, such sensor signals may additionally or alternative be used to control one or more of a position or orientation of the nearable device. As a non-limiting example, a position of a user while sleeping may be determined in image data such as, for example, by using machine vision techniques. In such examples, one or more motors (e.g., stepper motors, servos, or the like) may be used to adjust one or more of an orientation of the nearable device, a camera accessible to the nearable device, and/or an acoustic amplification component associated with the nearable device. In such examples, adjustments may be made to optimize one or more of a position of the user within sensor data, a quality or volume of sound played to the user, or the like.

Regardless of whether control signals are sent to one or more actuators, flow may proceed from either 708 or 710 back to 706. In various examples, such a process may continue to iterate until one or more of an amount of time has passed (e.g., 8 hours), a phase of sleep or a pattern of sleep phases is detected, a time of day is determined, or the like at which point flow proceeds to 712.

At 712, a wake sequence is initialized. The nearable enhancement device (and/or one or more processors or devices accessible or coupled thereto) may send one or more wake signals to one or more actuators to promote the user to naturally wake. In various examples, such a wake process may comprise slowly raising a level of lighting in the room, increasing the volume of one or more speakers, opening blinds, sending a command to other devices to begin a sequence (such as a coffee pot to begin brewing, a toaster to begin making toast, or the like). The coordination of these sensor outputs could be synchronized with the user's circadian rhythm in order to strengthen that rhythm and promote healthier sleep. Or, alternatively, if an intervention like sleep restriction is being employed by a clinician where specific bedtime or wake times are recommended based on the user's schedule and other factors, the wake up and wind down routine could be adjusted accordingly. In various examples, the user may be presented with a questionnaire or otherwise be prompted for input regarding, for example, a quality of sleep, alertness, or otherwise perform an alertness, vigilance, or cognitive test such that the input may be used to better calibrate or update any of the models or actions used by the nearable device to optimize the user's sleep, restfulness, alertness, etc. when using the nearable (e.g., by comparing the input to a sleep quality).

In at least some such examples, a spring-loaded latch associated with a smart phone coupled to the nearable device may be released. For example, an electromagnetic latch holding a smart phone down may be released. In such examples, an alarm signal (e.g., an audiovisual signal) may be played until the smart phone is depressed into the latching mechanism. An additional signal, such as an additional signal from the proximity sensor, may be used to determine whether such an alarm should be stopped, or the accelerometer sensor within a smart phone could be used. In one non-limiting example, the harder the user presses down on the nearable enhancement device, the longer the smart phone could be triggered to snooze for (e.g. the alarm will play again in 10 minutes versus 5 minutes).

The Computerized System

Figure 8:
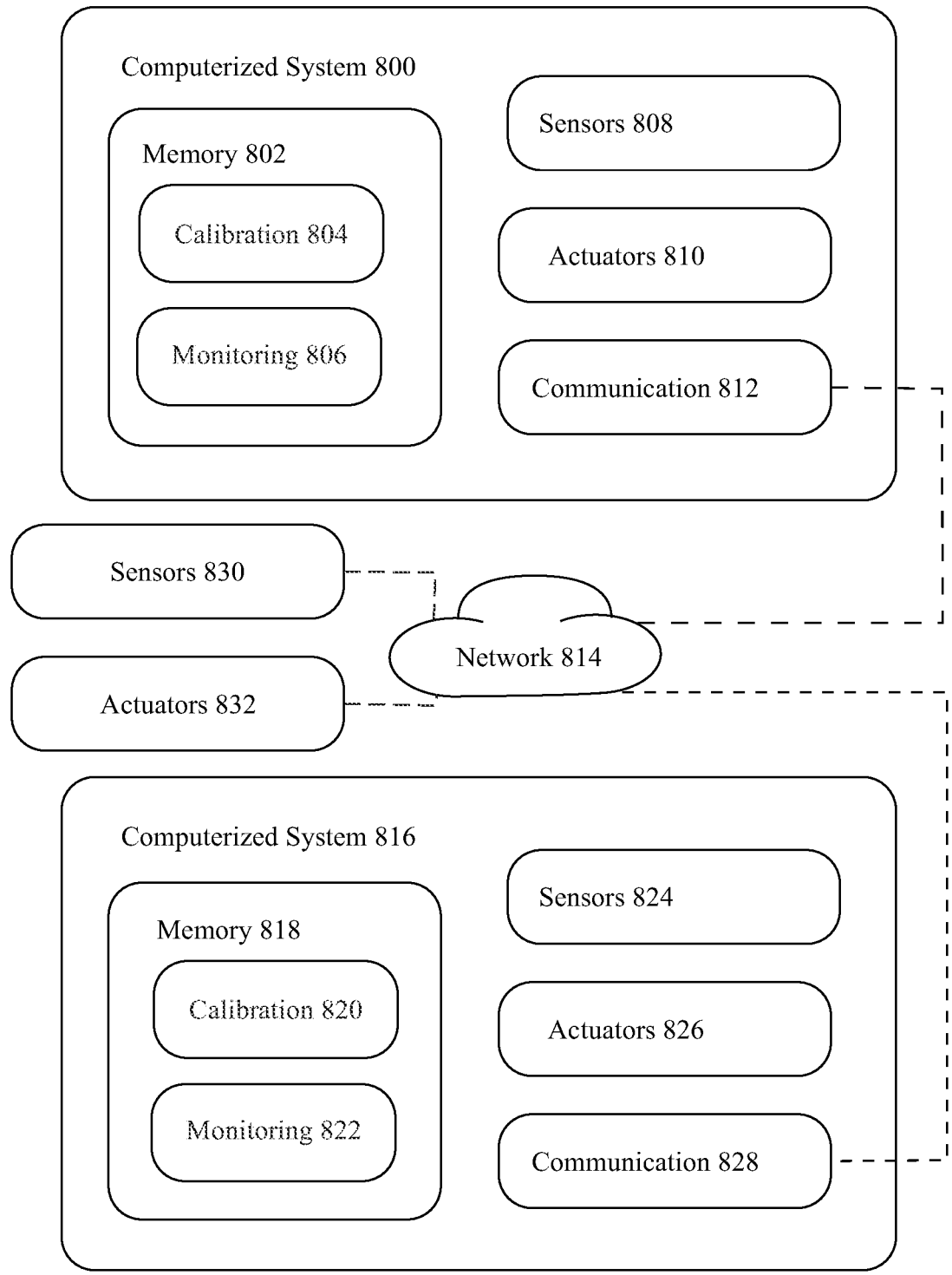
FIG. 8 depicts an example system to perform any of the techniques described herein.

FIG. 8 depicts a computerized system 800 as an example computerized system on which the any of the techniques described in detail herein may be implemented. For example, such a computerized system 800 may comprise any of the nearable devices illustrated in FIGS. 1-5, a smart phone, a smart watch, and/or any other system capable of implementing the techniques described herein including, without limitation, any one or more systems capable of performing any one or more of the operations described in detail with respect to FIGS. 6 and 7. Although depicted as a single system, such a computerized system 800 may comprise multiple computerized systems and may be either distributed locally, or remotely in various locations. Further, any component need not be local to a single system (e.g., any one or more of memory, processors, components, need not be co-located). The computerized system 800 depicts a computer system comprising memory 802, sensors 808, actuators 810, and a communication component 812. Omitted from FIG. 8 for clarity, such a computerized system 800 may further comprise one or more processors, one or more input/output devices (such as screens, keyboards, mice, buttons, etc.), and the like.

The systems and methods described herein can be implemented using one or more computing devices/systems which may or may not be physically or logically separate from each other. The methods may be performed by components arranged as either on-premise hardware, on-premise virtual systems, or hosted-private instances. Additionally, various aspects of the methods described herein may be combined or merged into other functions.

The present invention (or any part(s) or function(s) thereof) may be implemented using hardware, software, firmware, or a combination thereof and may be implemented in one or more computer systems or other processing systems. As illustrated, portions of the techniques described herein may be performed by computerized system 800, whereas other portions may be performed by computerized system 816. In some examples, the illustrated system elements could be combined into a single hardware device or separated into multiple hardware devices. If multiple hardware devices are used, the hardware devices could be physically located proximate to or remotely from each other. The examples of the methods described and illustrated are intended to be illustrative and not to be limiting. For example, some or all of the steps of the methods can be combined, rearranged, and/or omitted in different examples.

Such computerized systems 800, 816 may be computers, smartphones, personal digital assistants, smart watches, cloud-based servers (e.g., computer systems accessible over a network programmed to perform particular tasks), and the like.

Memory 802 and memory 818 may comprise, for example, random access memory (RAM), and a secondary memory, etc. Any portions of memory 802 and 818 may comprise transitory and non-transitory computer readable media and/or permanent or rewritable memory, as well as may be volatile and/or non-volatile. Memory 802 and/or memory 818 may be removable or non-removable. Various examples of memory 802, 818 include, but are not limited to, RAM (such as SRAM, DRAM, etc.), ROM (PROM, EPROM, EEPROM), flash memory, hard drives (magnetic, solid state, or the like), floppy drives, optical storage (such as CD-ROMs, DVD-ROMs, etc.), etc.

As illustrated, a portion of memory 802 may comprise non-transitory computer readable media storing instructions thereon which, when executed by the one or more processors, cause the one or more processors to perform any number of operations. As illustrated with respect to FIG. 8, such operations may comprise a calibration component 804 and a monitoring component 806. Additional details of such a calibration component 804 and monitoring components are discussed in detail herein and especially with respect to FIG. 6 and FIG. 7, respectively. Memory 818 may comprise similar such calibration component 820 and/or monitoring component 822.

Any one or more processors (not depicted) in either computerized system 400 and/or 414 may be capable of performing one or more operations based on one or more instructions, or otherwise. Such processors may comprise, for example, Central Processing Units (CPUs), Graphics Processing Units (GPUs), including, without limitation, when used for general purpose graphics programming (GPGPU), field-programmable gate arrays (FPGAs), Application Specific Integrated Circuits (ASICs), and/or any other hardware for performing any number of tasks which may be identified herein.

Any one or more of the computerized systems 800,818 may comprise any number of sensors 808,823 as described herein. As non-limiting examples, such sensors 808, 823 may include, but are not limited to, microphones, heart rate sensors, EEGs, EKGs, blood pressure sensors, temperature sensors (including remote user temperature monitoring sensors, such as RFID temperature tags), actigraphy sensors, electrodermal activity sensors, hydration sensors, accelerometers, gyroscopes, magnetometers, polysomnography sensors, image sensors (cameras, depth cameras, RGB cameras, intensity cameras), infrared sensors, SONAR, RADAR, etc. Any number (subset) of such sensors 808, 824 may be present on either computerized system 800 and/or computerized system 818. Such sensors 808, 824 may record one or more physiological parameters associated with a user for storage (e.g., in memory 802,818) and or transmission (e.g., over communication component 812, 828). In additional examples, as shown in FIG. 8, additional sensors 830, may be accessible to either one or computerized system 800 or 816 via one or more of a wired and/or wireless coupling. As described in detail herein, such additional sensors 830 may comprise, for example, pressure sensors under a mattress, remote temperature sensors, additional inertial measurement units (e.g., one or more of accelerometers, gyroscopes, etc.) coupled to a piece of furniture, or the like.

Any one or more of the computerized systems 800,816 may comprise any number of actuators 810, 826 as described herein. Such actuators 810,826 may comprise, for example, and combination of one or more of air conditioners, fans, lights (including infrared and visible), blind controls, motors (servos, stepper motors, etc.), displays (such as screens), speakers, ultrasonics, liquid atomizers or aerosolizers, haptic/vibrational feedback devices, electric shock discharge devices, transcranial stimulation, humidifiers, and the like. Either computerized system 800 or computerized system 816 may comprise different or similar (including the same) combinations of the one or more actuators 810, 826.

Further, as illustrated an at least in some examples, additional actuators 832 may be remote from any one or more of the computerized systems and accessible to the computerized systems over one or more wired and/or wireless couplings, such as illustrated in FIG. 8 as over network 814.

Either one or more of the computerized systems 800,816 may comprise one or more communication components 812,828. Such communication components 812,828 may enable either system to communicated with the other which, in some instances, may be over a network, such as network 814. In various examples, such communication components 812,828 may enable communication using wired and/or wireless communications. In any examples, such communication components 812,828 may use any combination of one or more of internet protocol, hypertext transfer protocol, file transfer protocol, address resolution protocol, internet control message protocol, transmission control protocol, user datagram protocol, and/or any other data communication protocol for transmission of data (token ring, ethernet, and the like).

When using a wireless transmission, such communication component 410,424 may comprise Bluetooth, BTLE, near-field communication (NFC), WiFi, 802.11x, WiMax, LTE, 3G, 4G, 5G, and/or various other wireless communication protocols, components, and/or devices.

The network 814 can include a private network, or a public network (for example the Internet, as described below), or a combination of both. The network includes hardware, software, or a combination of both. The network 814 may be LAN, WAN, or any combination thereof. The network 814 may comprise various nodes to perform various operations on the network, including, but not limited to, servers for routing requests and/or data, as well as cloud-based (remote) servers for data storage and/or manipulation. In at least some examples, such a network 814 may not be necessary. As a non-limiting example, either computerized system 800,816 may communicate directly with another computerized system using Bluetooth, NFC, ad-hoc WiFi, or the like.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

One or more examples of the invention may be practiced with other computer system configurations, including handheld devices, microprocessor systems, microprocessor-based or programmable consumer electronics, minicomputers, mainframe computers, etc. The invention may also be practiced in distributed computing environments where tasks are performed by remote processing devices that are linked through a network.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

CONCLUSION

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e. within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g. one or more of A, B, and/or C), unless stated otherwise, it is understood to include one or more of each element, including any one or more combinations of any number of the enumerated elements (e.g. A, AB, AB, ABC, ABB, etc.). When "and/or" is used, it should be understood that the elements may be joined in the alternative or conjunctive.

What is claimed is:

1. A system for monitoring sleep comprising:
a smart phone comprising a sensor;
a housing;
a first portion of the housing configured to couple the housing to a piece of furniture;
a second portion of the housing comprising a cradle configured to secure the smart phone mechanically to the housing;
one or more processors; and
one or more non-transitory computer readable media having instructions stored thereon which, when executed by the one or more processors, cause the one or more processors to perform the operations comprising:
receiving an initiation signal indicative of the smart phone being secured mechanically to the cradle of the housing;
causing, based at least in part on the initiation signal, the smart phone to initiate a sleep sequence;
receiving sensor data from the sensor of the smart phone;
determining, based at least in part on the sensor data, a phase of sleep of a user sleeping proximate the system; and
based at least in part on the phase of sleep, transmitting a signal to an actuator, the signal configured to control the actuator.

2. The system of claim 1, wherein the housing is comprised of material and shaped to block at least a portion of electromagnetic radiation emitted from the smart phone.

3. The system of claim 1, wherein the cradle of the housing comprises a latching mechanism, and
wherein the smart phone is releasably secured in the housing by the latching mechanism, thereby preventing the user from removing the smart phone from the cradle, and
wherein transmitting the signal comprises:
determining to wake the user; and
causing the latching mechanism to release the smart phone so that it is removable from the cradle by the user.

4. The system of claim 1,
wherein the sensor data comprises one or more of:
accelerometer data,
temperature data,
pressure data associated with a pressure sensor under a sleeping position of the user,
heart rate data of the user,
sound data detected by a microphone of the smart phone,
blood pressure data of the user, or
ambient light data, and
wherein the actuator comprises one or more of:
a fan,
a heating venting and air conditioning unit,
a light,
a screen,
a vibrational element,
a motor to move the smart phone,
means for applying electromagnetic stimulation
a latching mechanism,
a speaker, or
an atomizer to discharge a fragrance.

5. The system of claim 1, wherein transmitting the signal to the actuator comprises:
determining to induce, based at least in part on the phase of sleep, a valence association; and
causing one or more of a sound to be played, a screen to display a color of light, an ambient temperature to be adjusted, or a fragrance to be emitted to promote the valence association.

6. The system of claim 1, wherein the operations further comprise:
causing, based at least in part on the initiation signal and the data, one or more of:
lighting to be dimmed,
a sound to be played,
blinds to be closed, or
a fragrance to be emitted.

7. The system of claim 1, wherein the actuator comprises one or more of:
a fan,
a heating venting and air conditioning unit,
a light,
a vibrational element,
a screen,
a speaker,
an atomizer to discharge a fragrance, or
a latching mechanism.

8. The system of claim 1, the operations further comprising:
determining, based at least in part on the sensor data, whether the user is experiencing an onset of a medical condition; and
based at least in part on determining whether the user is experiencing a medical emergency, one or more of:
initiating a communication with a first responder via the smart phone;
causing an audio signal to be played to the user via the smart phone; or
causing a visual alert to be played to the user via the smart phone.

9. The system of claim 1, wherein the operations further comprise:
determining, based at least in part on the data, a sleep quality of the user;
receiving input from the user via the smart phone; and
comparing the input to the sleep quality.

10. The system of claim 1, wherein the cradle of the housing comprises an acoustic amplification structure shaped and positioned to amplify a sound emitted from a speaker of the smart phone and to direct the sound to a position of the user.

11. The system of claim 1, wherein the housing further comprises a proximity sensor and wherein transmitting the signal comprises:
determining to wake the user; and
continuously causing an audio or visual alarm to be played until an additional signal from the proximity sensor is received, the additional signal indicating that the user has removed the smart phone from the cradle.

12. The system of claim 1, wherein the instructions when executed by the one or more processors cause the one or more processors to perform:
detecting, by at least one accelerometer of the smart phone, motion of the user in the bed.

13. The system of claim 12, wherein determining the phase of sleep comprises:

determining the phase of sleep based on the detected motion of the user in the bed.

14. The system of claim 1, wherein the cradle of the housing comprises a magnet configured to releasably secure the smart phone to the cradle.

15. The system of claim 1, wherein the smart phone comprises a camera, and
wherein the cradle of the housing comprises a filter to block the camera from recording identifiable information about the user.

16. A method comprising:
receiving, from a proximity sensor located in a housing coupled to a bed and configured to receive a smart phone, an initiation signal indicative of a smart phone being proximate to the housing and of the smart phone being releasably secured in a cradle of the housing and of the smart phone starting to charge;
causing, based at least in part on the initiation signal and a time at which the initiation signal is received, the smart phone to initiate a sleep sequence configured to promote sleep of a user proximate the housing, the sleep sequence comprising one or more of:
causing a speaker of the smart phone to emit one or more sounds, or
causing a screen of the smart phone to display one or more of messages or colors;
receiving sensor data from the smart phone, the sensor data including:
motion data determined by an accelerometer of the smart phone, the motion data indicating motion of a user in the bed during sleep, and
sound data determined by a microphone of the smart phone, the sound data indicating a heart rate of the user during sleep;
determining, based on the motion data and the sound data of the sensor data, a phase of sleep of the user; and
based at least in part on the phase of sleep, transmitting a signal to an actuator, the signal configured to control the actuator.

17. The system of claim 16, wherein the housing is comprised of material and shaped to block at least a portion of electromagnetic radiation from reaching the user.

18. The system of claim 16, wherein the cradle of the housing comprises a latching mechanism,
wherein the smart phone is releasably secured in the housing by the latching mechanism thereby preventing the user from removing the smart phone from the cradle, and
wherein transmitting the signal comprises:
determining to wake the user; and
causing the latching mechanism to release the smart phone so that is removable from the cradle by the user.

19. The system of claim 16, wherein the cradle of the housing comprises an acoustic amplification component portion shaped and positioned to amplify a sound emitted from a speaker of the smart phone and to direct the sound to a position of the user.

20. The system of claim 16,
wherein the sensor data comprises one or more of:
accelerometer data associated with an accelerometer coupled to a bed frame where the user is sleeping,
temperature data,
pressure data associated with a pressure sensor under a sleeping position of the user,
heart rate data of the user,
sound data detected by a microphone of the smart phone,
blood pressure data of the user, or
ambient light data.

21. The method of claim 16, wherein the actuator comprises one or more of:
a fan,
a heating venting and air conditioning unit,
a light,
a vibrational element,
a screen,
means for applying electromagnetic stimulation,
a latching mechanism,
a speaker, or
an atomizer to discharge a fragrance.

22. The system of claim 16, wherein transmitting the signal to the actuator comprises:
determining to induce, based at least in part on the phase of sleep, a valence association; and
causing one or more of a sound to be played, a screen to display a color of light, an ambient temperature to be adjusted, or a fragrance to be emitted to promote the valence association.

23. A system comprising:
a smart phone comprising at least one sensor;
a housing comprising a cradle comprising a magnet and configured to receive mechanically the smart phone and secure the smart phone to the cradle using the magnet, the housing being configured to couple to a bed;
the smart phone further comprising:
one or more processors; and
one or more non-transitory computer readable media having instructions stored thereon which, when executed by the one or more processors, cause the one or more processors to perform the operations comprising:
receiving an initiation signal indicative of the smart phone being in the cradle and of the smart phone starting to charge and one or more of:
a current time,
a location of the smart phone,
a detection of a near field communication code at the cradle, or
a command from a user;
causing, based at least in part on the initiation signal, the smart phone to initiate a sleep sequence;
receiving motion data detected by one or more accelerometers of the smart phone;
determining, based on the motion data, a phase of sleep of a user sleeping proximate the housing; and
based at least in part on the phase of sleep, transmitting a signal to an actuator, the signal configured to control the actuator.

* * * * *